(12) United States Patent
Uchi et al.

(10) Patent No.: US 8,135,882 B2
(45) Date of Patent: Mar. 13, 2012

(54) APPARATUS AND MANAGING METHOD USING A PRESET POLICY BASED ON AN INVALIDATED I/O PATH BY USING CONFIGURATION INFORMATION ACQUIRED FROM STORAGE SYSTEM

(75) Inventors: Hirokazu Uchi, Yokohama (JP); Hideo Ohata, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 229 days.

(21) Appl. No.: 12/453,363

(22) Filed: May 8, 2009

(65) Prior Publication Data

US 2010/0228888 A1   Sep. 9, 2010

(30) Foreign Application Priority Data

Mar. 5, 2009   (JP) .................................. 2009-052449

(51) Int. Cl.
*G06F 13/20*   (2006.01)
*G06F 3/06*   (2006.01)

(52) U.S. Cl. .................. 710/38; 710/10; 710/18; 710/8; 710/9; 709/222; 709/223; 709/224; 370/254; 370/352; 370/238

(58) Field of Classification Search ................ 710/8–10, 710/18, 38; 709/222–224; 370/254, 352
See application file for complete search history.

(56) References Cited

U.S. PATENT DOCUMENTS

| | | | | |
|---|---|---|---|---|
| 7,120,912 B2 * | 10/2006 | Kadoiri et al. | ................ | 718/104 |
| 7,143,008 B2 * | 11/2006 | Ochi et al. | .................... | 702/186 |
| 7,277,821 B2 | 10/2007 | Ochi et al. | | |
| 7,509,443 B2 * | 3/2009 | Matsuo et al. | .................. | 710/38 |
| 7,656,806 B2 * | 2/2010 | Hinata et al. | .................. | 370/238 |
| 7,685,628 B2 * | 3/2010 | Fukui et al. | ........................ | 726/2 |
| 2008/0198764 A1 * | 8/2008 | Keller | ........................... | 370/254 |

FOREIGN PATENT DOCUMENTS

| | | |
|---|---|---|
| JP | 2003-273951 | 9/2003 |
| JP | 2006-107126 | 10/2004 |
| JP | 2006-107126 | 4/2006 |
| JP | 2007-287064 | 11/2007 |

OTHER PUBLICATIONS

Notification of Reasons for Rejection issued by the Japanese Patent Office on May 24, 2011 in the corresponding Japanese Patent Application No. 2009-052449 (3 pages), including an English language translation (2 pages).

* cited by examiner

*Primary Examiner* — Tammara Peyton
(74) *Attorney, Agent, or Firm* — Stites & Harbsison, PLLC; Juan Carlos A. Marquez, Esq.

(57) ABSTRACT

In order to appropriately manage configuration information acquired from a storage system for the purpose of performance management, etc., an information processing apparatus managing the configuration information, i.e., information indicative of a configuration of resources making up the storage system in a database, detects a change in setting of an I/O path to extract resources making up an invalidated I/O path, which is the I/O path subject to the change, as monitoring object resources, acquires performance information that is information indicative of operation statuses of the monitoring object resources from the storage system, judges whether the performance information of the monitoring object resource matches a preset policy, determines a timing to make invalidated configuration information, which is the configuration information related to the invalidated I/O path, deletable from the storage device based on the result of the judgement, and deletes the invalidated configuration information from the database when the determined timing comes.

14 Claims, 24 Drawing Sheets

RESOURCE CONFIGURATION INFORMATION 400

APPLICATION/FILE SYSTEM CORRELATION

| ACQUISITION DATE/TIME | APPLICATION | FILE SYSTEM |
|---|---|---|
| 2007/07/07 06:00 | APPLICATION A | FILE SYSTEM A |

FILE SYSTEM/VOLUME CORRELATION

| ACQUISITION DATE/TIME | FILE SYSTEM | VOLUME |
|---|---|---|
| 2007/07/07 06:00 | FILE SYSTEM A | VOLUME A |

VOLUME/SERVER PORT CORRELATION

| ACQUISITION DATE/TIME | VOLUME | SERVER PORT |
|---|---|---|
| 2007/07/07 06:00 | VOLUME A | PORT A |

SERVER PORT/SWITCH PORT CORRELATION

| ACQUISITION DATE/TIME | SERVER PORT | SWITCH PORT |
|---|---|---|
| 2007/07/07 06:00 | PORT A | PORT D |

SWITCH PORT/SWITCH PORT CORRELATION

| ACQUISITION DATE/TIME | SWITCH PORT | SWITCH PORT |
|---|---|---|
| 2007/07/07 06:00 | PORT E | PORT F |

SWITCH PORT/STORAGE PORT CORRELATION

| ACQUISITION DATE/TIME | SWITCH PORT | STORAGE PORT |
|---|---|---|
| 2007/07/07 06:00 | PORT G | PORT P |

STORAGE PORT/LOGICAL VOLUME CORRELATION

| ACQUISITION DATE/TIME | STORAGE PORT | LOGICAL VOLUME |
|---|---|---|
| 2007/07/07 06:00 | PORT P | LOGICAL VOLUME A |

LOGICAL VOLUME/RAID GROUP CORRELATION

| ACQUISITION DATE/TIME | RAID GROUP | LOGICAL VOLUME |
|---|---|---|
| 2007/07/07 06:00 | RAID GROUP A | LOGICAL VOLUME A |

FIG. 4

PERFORMANCE INFORMATION 500
(SERVER 2)

| ⁶¹¹ ACQUISITION DATE/TIME | ⁶¹² RESOURCE | ⁶¹³ METRICS VALUE |
|---|---|---|
| 2007/07/07 06:00 | FILE A | 1214.5 |
| 2007/07/07 06:00 | VOLUME A | 2200.5 |
| 2007/07/07 06:00 | PORT A | 1237.3 |
| ... | ... | ... |
| 2007/07/07 06:30 | FILE A | 1248.1 |
| 2007/07/07 06:30 | VOLUME A | 1989.3 |
| 2007/07/07 06:30 | PORT A | 1253.2 |
| ... | ... | ... |

FIG. 6A

PERFORMANCE INFORMATION 500
(SWITCH 4)

| ⁶¹¹ ACQUISITION DATE/TIME | ⁶¹² RESOURCE | ⁶¹³ METRICS VALUE |
|---|---|---|
| 2007/07/07 06:00 | PORT D | 1213.6 |
| 2007/07/07 06:00 | PORT E | 1247.5 |
| 2007/07/07 06:00 | PORT F | 1252.3 |
| 2007/07/07 06:00 | PORT G | 1236.5 |
| 2007/07/07 06:00 | PORT H | 1224.3 |
| 2007/07/07 06:00 | PORT I | 1212.3 |
| 2007/07/07 06:00 | PORT J | 1452.3 |
| ... | ... | ... |
| 2007/07/07 06:30 | PORT D | 1215.3 |
| 2007/07/07 06:30 | PORT E | 1265.3 |
| 2007/07/07 06:30 | PORT F | 1245.6 |
| 2007/07/07 06:30 | PORT G | 1243.6 |
| 2007/07/07 06:30 | PORT H | 1235.2 |
| 2007/07/07 06:30 | PORT I | 1425.6 |
| 2007/07/07 06:30 | PORT J | 1245.7 |
| ... | ... | ... |

FIG. 6B

PERFORMANCE INFORMATION 600
(STORAGE APPARATUS 3)

| ACQUISITION DATE/TIME | RESOURCE | METRICS VALUE |
|---|---|---|
| 2007/07/07 06:00 | PORT P | 1215.6 |
| 2007/07/07 06:00 | PORT Q | 1253.3 |
| 2007/07/07 06:00 | PORT R | 1100.2 |
| 2007/07/07 06:00 | LOGICAL VOLUME A | 1199.3 |
| 2007/07/07 06:00 | LOGICAL VOLUME B | 1238.7 |
| 2007/07/07 06:00 | LOGICAL VOLUME C | 1268.9 |
| 2007/07/07 06:00 | LOGICAL VOLUME D | 1425.3 |
| 2007/07/07 06:00 | RAID GROUP A | 1198.5 |
| 2007/07/07 06:00 | RAID GROUP B | 2238.9 |
| 2007/07/07 06:00 | RAID GROUP C | 2200.7 |
| ... | ... | ... |
| 2007/07/07 06:30 | PORT P | 1217.5 |
| 2007/07/07 06:30 | PORT Q | 1242.3 |
| 2007/07/07 06:30 | PORT R | 1112.3 |
| 2007/07/07 06:30 | LOGICAL VOLUME A | 1200.5 |
| 2007/07/07 06:30 | LOGICAL VOLUME B | 1238.6 |
| 2007/07/07 06:30 | LOGICAL VOLUME C | 1268.7 |
| 2007/07/07 06:30 | LOGICAL VOLUME D | 1468.7 |
| 2007/07/07 06:30 | RAID GROUP A | 2200.4 |
| 2007/07/07 06:30 | RAID GROUP B | 2236.8 |
| 2007/07/07 06:30 | RAID GROUP C | 2135.7 |
| ... | ... | ... |

FIG. 6C

REGISTRATION CONTENTS OF MONITORING
OBJECT RESOURCE DATABASE 214 (EXAMPLE)

| MONITORING OBJECT RESOURCE |
| --- |
| APPLICATION C |
| FILE SYSTEM C |
| VOLUME B |
| PORT C |
| PORT H |
| PORT I |
| PORT J |
| PORT K |
| PORT Q |
| LOGICAL VOLUME B |
| RAID GROUP A |
| APPLICATION A |
| FILE SYSTEM A |
| VOLUME A |
| PORT A |
| PORT D |
| PORT E |
| PORT F |
| PORT G |
| PORT P |
| LOGICAL VOLUME A |
| ⋮ |

FIG. 9

APPARATUS AND MANAGING METHOD USING A PRESET POLICY BASED ON AN INVALIDATED I/O PATH BY USING CONFIGURATION INFORMATION ACQUIRED FROM STORAGE SYSTEM

CROSS-REFERENCE TO RELATED APPLICATIONS

The present application claims priority from Japanese Patent Application No. 2009-052449 filed on Mar. 5, 2009, the content of which herein incorporated by reference.

BACKGROUND

1. Field of the Invention

The present invention relates to an information processing apparatus and a managing method of configuration information acquired from a storage system and, more particularly, to a technology for effectively utilizing a storage resource to appropriately manage information acquired from a storage system.

2. Description of the Related Art

In general, when managing the performance of a system including a wide variety and types of resources such as a storage system, agents are prepared that correspond to the resources such as management object apparatuses and software operated in the management object apparatuses; a managing apparatus (manager) acquires information related to configurations and performances of the resources (management information) from these agents; and the managing apparatus monitors a state of the storage system as needed based on the acquired management information to perform appropriate performance management.

The management of the management information becomes problematic in the managing apparatus. Especially when a scale of the storage system increases, the management information also becomes enormous and wastes storage resources. Unwanted management information makes it difficult to more appropriately comprehend a situation and may result in troubles in management operations.

Therefore, for example, Japanese Patent Application Laid-Open Publication No. 2006-107126 describes that an importance of performance information collected from a storage system is determined in accordance with the possibility of the performance information to be used for research of deterioration in the performance, thereby the preservation period of the performance information is adjusted.

Although the preservation period of the performance information is adjusted in Japanese Patent Application Laid-Open Publication No. 2006-107126, when the managing apparatus provides information related to monitoring of performance to users, configuration information of a storage system is also necessary in addition to the performance information. Therefore, to achieve effective utilization of storage resources, a preservation period must also appropriately be set for the configuration information. Since purposes of utilization of the configuration information and the performance information widely vary depending on aspects of the monitoring, etc., the preservation periods are preferably set in accordance with needs of users as long as possible.

SUMMARY

The present invention was conceived in view of the above problems and it is therefore the object of the present invention to provide an information processing apparatus capable of appropriately managing configuration information acquired from a storage system for the purpose of performance management, etc., and a managing method of the configuration information acquired from a storage system.

In order to achieve the above object, according to a major aspect of the present invention, there is provided an information processing apparatus for managing configuration information indicative of a configuration of resources making up a storage system with which I/O paths are set in a storage device, comprising a monitoring object detecting unit that detects a change in the setting of an I/O path to extract resources making up an invalidated I/O path, which is the I/O path subjected to the change, as monitoring object resources, a performance information acquiring unit that acquires performance information indicative of performances of the monitoring object resources from the storage system, a performance information monitoring unit that judges whether the performance information of the monitoring object resource matches a preset policy, and a deletion period setting unit that determines a timing to make invalidated configuration information, which is a configuration information related to the invalidated I/O path, deletable from the storage device based on the result of the judgement, and manages the determined timing in a manner correlated with the configuration information.

According to the present invention, the preservation period may appropriately be set for the configuration information. The deletion period of the invalidated configuration information is determined based on whether the performance information of the monitoring object resource making up the invalidated I/O path matches the policy. Therefore, the configuration information may appropriately be managed in accordance with the user's needs (policy).

One of other aspects of the present invention provides the information processing apparatus, in which the monitoring object detecting unit extracts resources making up another I/O path sharing the resource making up the invalidated I/O path with the invalidated I/O path as the monitoring object resource in addition to the resources making up the invalidated I/O path.

As above, in addition to the resources making up the invalidated I/O path, the monitoring object detecting unit extracts also resources making up another I/O path sharing the resource making up the I/O path as the monitoring object resources. Therefore, the configuration information related to the invalidated I/O path may appropriately be extracted and the configuration information may appropriately be managed.

The invalidated configuration information is at least one of I/O path definition information indicative of the configuration of the I/O path and resource configuration information that defines relationships among a plurality of the resources making up the I/O path.

The storage system may include, for example, a storage apparatus, a server apparatus accessing the storage apparatus, and a switch communicably coupling the storage apparatus and the server apparatus. The I/O path may be set by correlating at least two or more of an application of the server apparatus, a file system of the server apparatus, a volume provided to the file system by the server apparatus, a server port that is a communication port of the server apparatus, a switch port that is a communication port of the switch, a storage port that is a communication port of the storage apparatus, a logical volume provided by the storage apparatus, and a RAID group making up the logical volume.

The policy is at least one of a first policy representative of whether a performance failure is occurring in the monitoring object resources, a second policy representative of whether a possibility of occurrence of a performance failure exists in the monitoring object resources, and a third policy representative of whether the performance of the monitoring object resources is stable, for example.

The information processing apparatus further comprises a configuration information deleting unit that deletes the configuration information from the database when the timing (date and time) determined by the deletion period setting unit comes.

The information processing apparatus further comprises a configuration information displaying unit that provides a user interface for displaying the configuration information stored in the storage device and a display object setting unit that provides a user interface for setting the configuration information to be displayed by the configuration information displaying unit.

The display object setting unit provides a first user interface for specifying identifiers of resources making up the invalidated I/O path, and a second user interface for specifying the invalidated I/O path which is set (defined) with the use of resources identified by the identifiers of the resources accepted by the first user interface, and the configuration information displaying unit displays the configuration information of the specified invalidated I/O path.

The information processing apparatus further comprises a policy setting unit that provides a user interface for setting the policy.

The above and other problems and solutions thereto disclosed herein will become apparent from the following description of the preferred embodiments of the present invention with reference to the accompanying drawings.

According to the present invention, configuration information acquired from a storage system for the purpose of performance management, etc., may appropriately be managed.

BRIEF DESCRIPTION OF THE DRAWINGS

FIG. 4 is a diagram of an example of resource configuration information 400;

FIG. 6A depicts an example of performance information 600;

FIG. 6B depicts an example of the performance information 600;

FIG. 6C depicts an example of the performance information 600;

FIG. 9 depicts an example of registered contents of a monitoring object resource database 214;

DETAILED DESCRIPTION OF THE EMBODIMENTS

Exemplary embodiments of the present invention will now be described in detail with reference to the accompanying drawings.

Figure 1A:
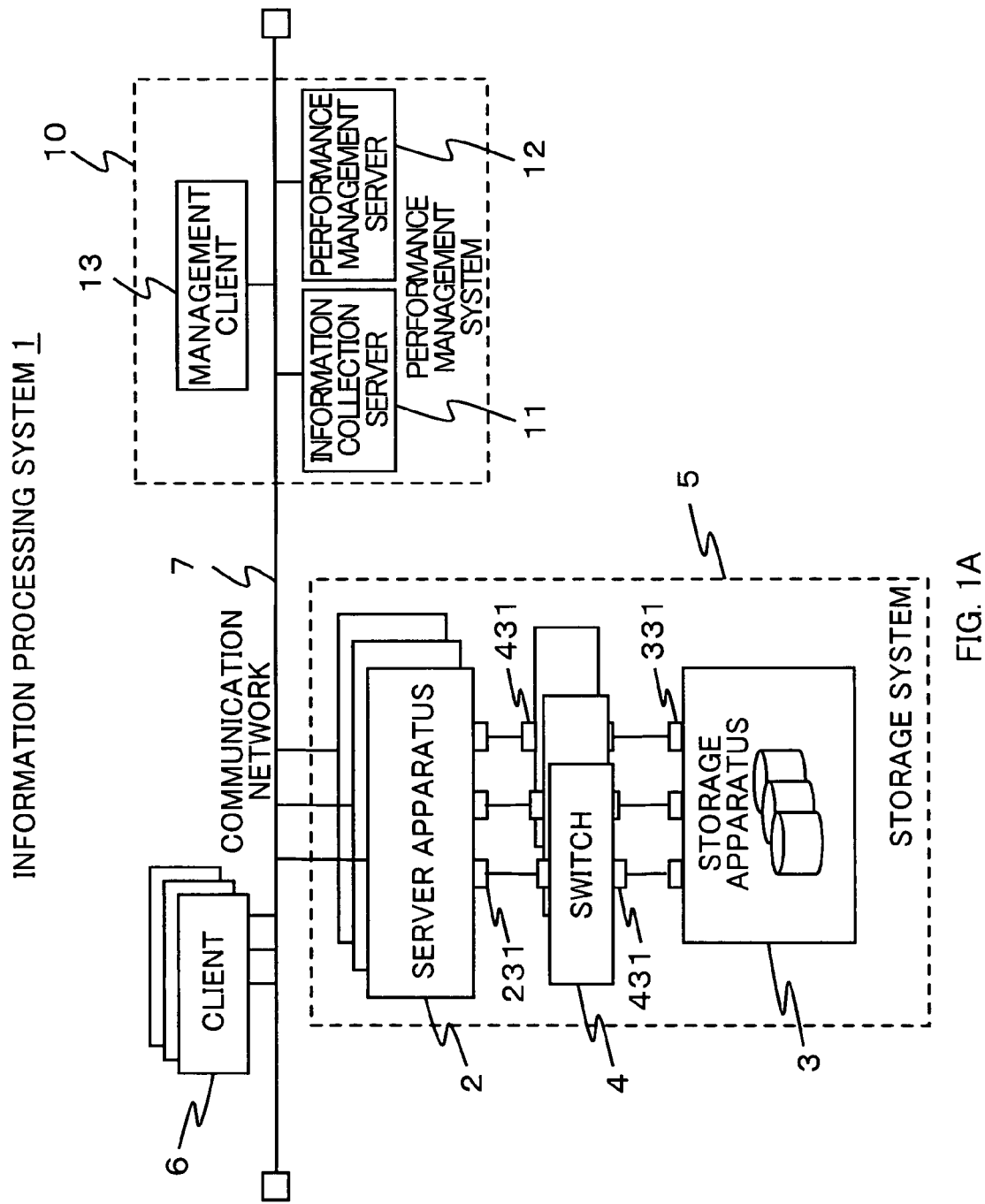
FIG. 1A is a diagram of a configuration of an information processing system 1 described as Example 1.

FIG. 1A depicts a configuration of an information processing system 1 described below as an embodiment. As shown in FIG. 1, the information processing system 1 includes one or more server apparatuses 2, one or more storage apparatuses 3, one or more switches 4, one or more clients 6, an information collection server 11, a performance management server 12, and a management client 13.

The server apparatuses 2 are communicably coupled to the storage apparatuses 3 through the switches 4. The server apparatuses 2, the switches 4, and the storage apparatuses 3 make up a storage system 5 accessed by the clients 6. The clients 6 are communicably coupled to the server apparatuses 2 through a communication network 7. The communication network 7 is a LAN (local area network), a WAN (wide area network), the internet, a public communication network, a private line, etc.

The server apparatuses 2 have one or more communication ports (hereinafter, server ports 231). The storage apparatuses 3 have one or more communication ports (hereinafter, storage ports 331). The switches 4 have one or more communication ports (hereinafter, switch ports 431) having the server ports 231 or the storage ports 331 as counterparts.

The switches 4 make up a storage network coupling the server apparatuses 2 and the storage apparatuses 3. If the storage network is configured as LAN or WAN, the switches 4 are LAN switches (such as switching hubs conforming to 10 BASE-T, 100 BASE-T, or 1000 BASE-T (TX)). If the storage network is configured as SAN (storage area network), the switches 4 are fiber channel switches.

In the server apparatus 2, an operating system and applications (such as a business application, a system management application, and a database management application) are operated. When a data I/O request is generated by the operating system or an application, an I/O command (e.g., a data write request or a data read request) is issued (transmitted) to the storage apparatus 3. Upon receipt of the I/O command, the storage apparatus 3 performs control corresponding to the received I/O command for a recording medium such as a hard disk device and transmits a data write completion notification, a data read completion notification, data read from the recording medium, etc., to the server apparatus 2.

The information collection server 11, the performance management server 12, and the management client 13 are coupled to the communication network 7 and may communicate with each other. The information collection server 11, the performance management server 12, and the management client 13 make up a performance management system 10 that manages the performance of the storage system 5.

The information collection server 11 and the performance management server 12 may communicate through the communication network 7 with the server apparatuses 2, the storage apparatuses 3, and the switches 4. The information collection server 11 and the performance management server 12 may communicably coupled to the server apparatuses 2, the storage apparatuses 3, and the switches 4 through a communicating means different from the communication network 7 (e.g., another communication network provided for management).

The information collection server 11 collects information (hereinafter, configuration information) related to a configuration and information (hereinafter, performance information) related to a performance (operation status) for each of the server apparatuses 2, the storage apparatuses 3, and the switches 4 and provides the collected configuration information or performance information to the performance management server 12 as needed. A database management system (DBMS) managing the configuration information and the performance information is operated in the information collection server 11.

The performance management server 12 monitors and controls the storage system 5 (the server apparatuses 2, the storage apparatuses 3, and the switches 4) based on the configuration information and the performance information provided from the information collection server 11. A database management system (DBMS) managing the configuration information and the performance information provided from the information collection server 11 is operated in the performance management server 12.

The management client 13 includes CUI (character user interface) (or CLI (command line interface)) or GUI (graphic user interface). The management client 13 provides a user interface for monitoring and controlling the storage system 5 with the use of the information collection server 11 and the performance management server 12.

Although the performance management system 10 is made up of three independent pieces of hardware, i.e., the information collection server 11, the performance management server 12, and the management client 13 in FIG. 1A, the hardware configuration of the performance management system 10 is not limited to this configuration. For example, two or more of these pieces of hardware may be stored in a single housing to make up the performance management system 10.

Figure 1B:
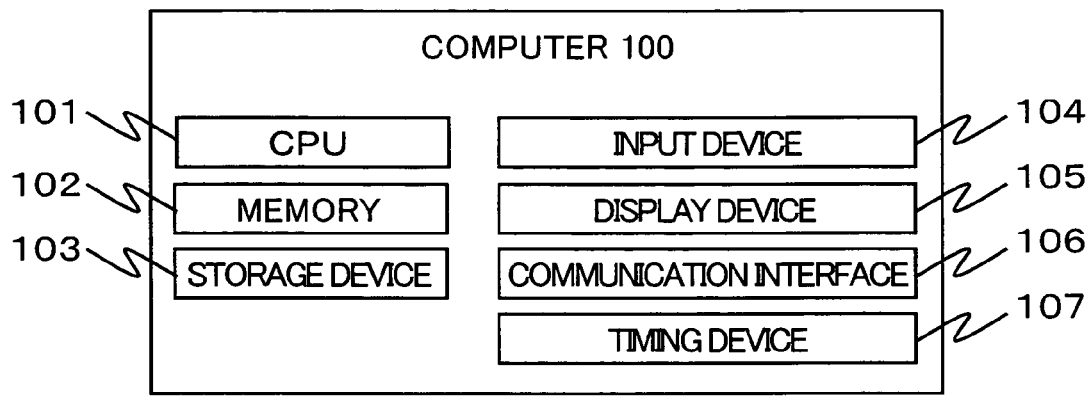
FIG. 1B is a diagram of an example of a hardware configuration of a computer 100 (information processing apparatus) capable to be used as a server apparatus 2, a client 6, an information collection server 11, a performance management server 12, and a management client 13.

FIG. 1B depicts an example of a hardware configuration of a computer 100 (information processing apparatus) capable to be used as the server apparatus 2, the client 6, the information collection server 11, the performance management server 12, and the management client 13. As shown in FIG. 1B, the computer 100 includes a CPU 101, a memory 102 (RAM (random access memory) or ROM (read only memory)), a storage device 103 (e.g., hard disk and solid state drive (SSD)), an input device (such as a keyboard and a mouse) accepting operational input from users, a displaying device 105 (such as a liquid crystal monitor and a cathode-ray tube display), a communication interface (such as NIC (network interface card) and HBA (host bus adapter)) for communicating with other devices, and a timing device 107 made up with the use of RTC (real time clock) or a timer circuit to output timing information such as the current date and time and elapsed time.

Figure 1C:
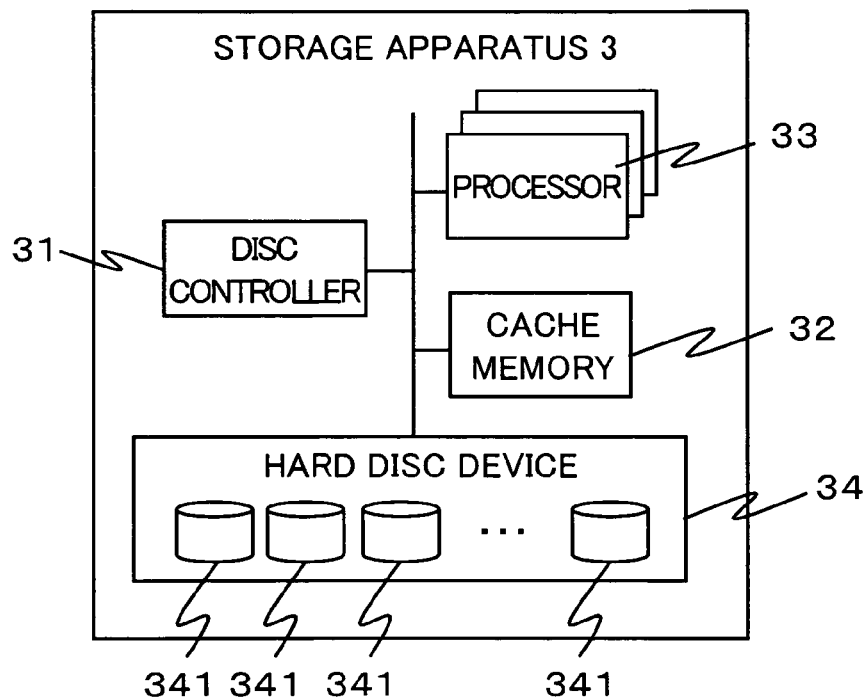
FIG. 1C is a diagram of an example of hardware of a storage apparatus 3.

FIG. 1C depicts an example of hardware of the storage apparatus 3. As shown in FIG. 1C, the storage apparatus 3 includes a disc controller 31, a cache memory 32, one or more processors 33, and a disc device 34. The processor 33 communicates through the switch 4 with the server apparatus 2. The disc controller 31 includes a CPU and a memory. The disc controller 31 performs various processes for implementing the functions of the storage apparatus 3. The disc device 34 includes one or more hard discs 341 (physical discs) as a data recording medium. The cache memory 32 stores, for example, data written into the disc device 34 or data read from the disc device 34. One type of the storage apparatuses 3 with such a configuration is a disc array apparatus made up of a plurality of hard disc devices controlled by RAID (redundant arrays of inexpensive (or independent) discs), for example.

Figure 1D:
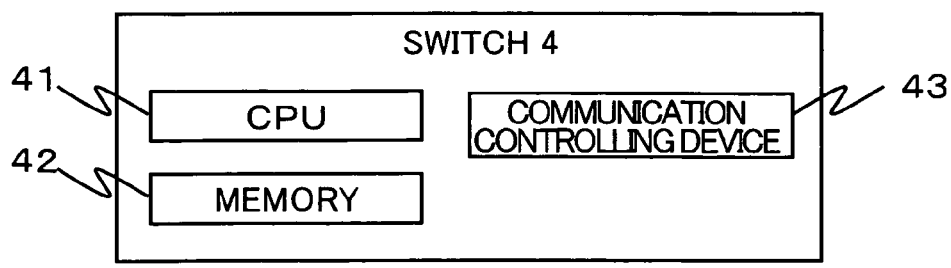
FIG. 1D is a diagram of an example of a hardware configuration of a switch 4.

FIG. 1D depicts an example of a hardware configuration of the switch 4. The switch 4 includes a CPU 41, a memory 42, and a communication controlling device 43. The CPU 41 executes a program stored in the memory 42 to implement functions such as a management function for correlations between the communication ports 431 of the switch 4 and network addresses, a filtering function, and a security function. The memory 42 is RAM, ROM, or nonvolatile memory (e.g., flash memory), for example. The memory 42 stores, for example, programs and firmware for implementing the above functions, various tables for managing correlations between transmission sources and transmission destinations such as network addresses and port numbers, and setup information related to the filtering function and the security function. The communication controlling device 43 is, for example, a switch controller and performs transfer control for input/output frames and packets between communication ports 431 based on transmission source information and transmission destination information of the frames and packets input/output to/from the communication ports 431.

<Description of Functions>

Figure 2:
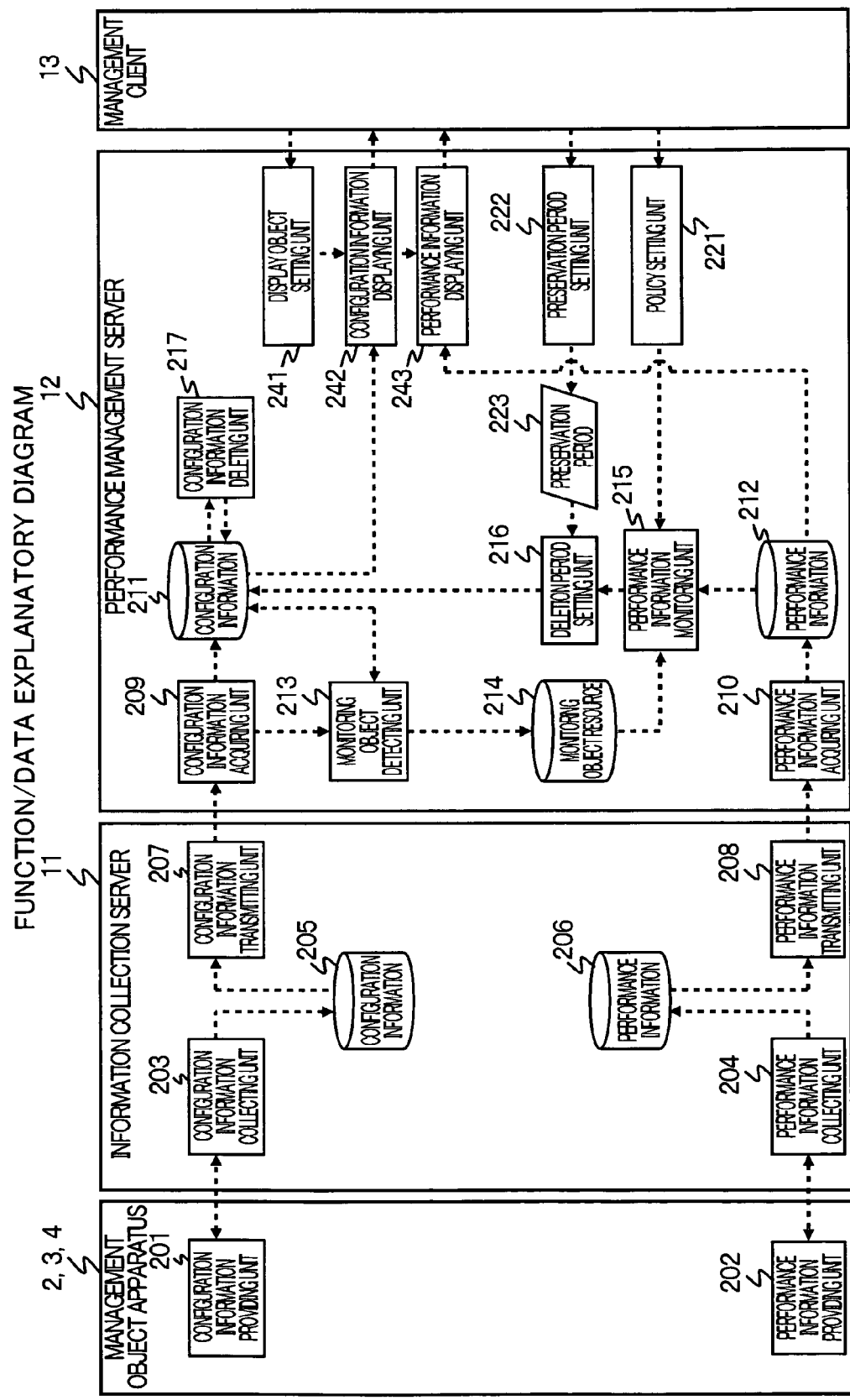
FIG. 2 is a diagram of main functions and data in the information processing system 1.

FIG. 2 depicts main functions and main data included in the information collection server 11 and the performance management server 12 as well as each of the server apparatuses 2, the storage apparatuses 3, and the switches 4 (hereinafter, collectively referred to as a management object apparatus) having configurations and performances monitored and controlled by the information collection server 11 and the performance management server 12.

As shown in FIG. 2, the management object apparatus (the server apparatuses 2, the storage apparatuses 3, and the switches 4) further includes a configuration information providing unit 201 and a performance information providing unit 202 in addition to the functions inherently included in each of the apparatuses. These functions are implemented by executing the programs stored in the memory of the management object apparatus with the hardware included in the management object apparatus or the processor (CPU or MPU (micro processing unit)) included in the management object apparatus.

As shown in FIG. 2, the information collection server 11 includes a configuration information collecting unit 203, a configuration information database 205, a configuration information transmitting unit 207, a performance information collecting unit 204, a performance information database 206, and a performance information transmitting unit 208. These functions are implemented by the hardware included in the information collection server 11 or by executing the programs stored in the memory 102 of the information collection server 11 with the CPU 101 of the information collection server 11.

As shown in FIG. 2, the performance management server 12 includes a configuration information acquiring unit 209, a performance information acquiring unit 210, a configuration information database 211, a performance information database 212, a monitoring object detecting unit 213, a monitoring object resource database 214, a performance information monitoring unit 215, a deletion period setting unit 216, a configuration information deleting unit 217, a policy setting unit 221, a preservation period setting unit 222, a display object setting unit 241, a configuration information displaying unit 242, and a performance information displaying unit 243. These functions are implemented by the hardware included in the performance management server 12 or by executing the programs stored in the memory 102 of the performance management server 12 with the CPU 101 of the performance management server 12.

The configuration information providing unit 201 provides (transmits) the configuration information of the management object apparatus to the configuration information collecting unit 203 of the information collection server 11. The performance information providing unit 202 provides (transmits) the performance information of the management object apparatus to the performance information collecting unit 204 of the information collection server 11.

The configuration information includes information indicative of a relation of resources (hardware resources or software resources) making up the management object apparatus (hereinafter, resource configuration information) and information related to a path (hereinafter, I/O path) used for transmitting an I/O request from the server apparatus 2 to the storage apparatus 3 and receiving the I/O request (hereinafter, I/O path definition information). The configuration information database 211 of the performance management server 12 stores these resource configuration information and the I/O path definition information as the configuration information of the management object apparatus.

Figure 3:
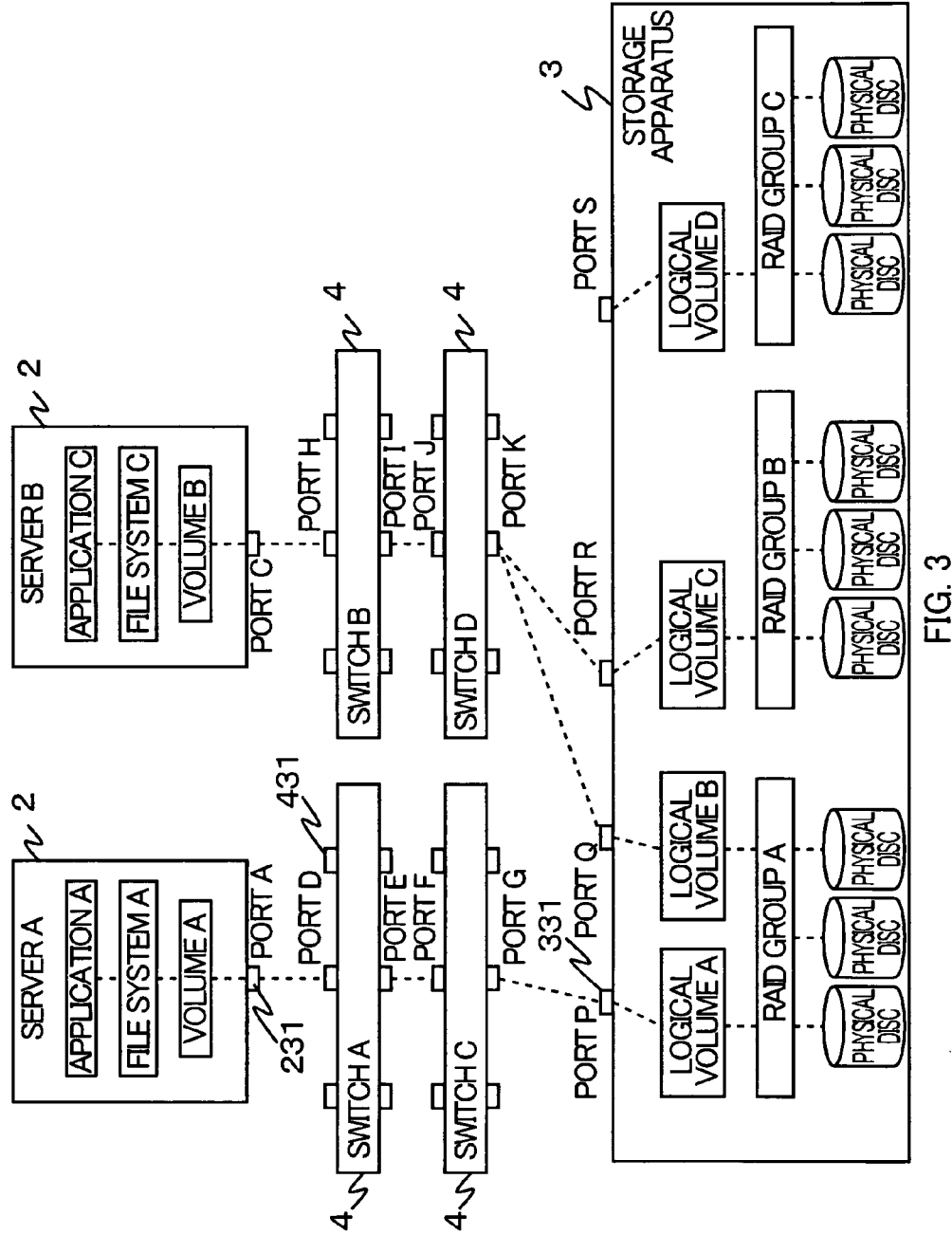
FIG. 3 is a diagram of a configuration of resources of a storage system 5.

FIG. 3 depicts resources of the storage system 5. In FIG. 3, the resources include applications, file systems, and volumes (volumes provided in the server apparatuses, which are storage areas different from logical volumes of the storage apparatus 3 described later) operated in the server apparatus 2, the server ports 231, the switch ports 431, the storage ports 331, the logical volumes (e.g., LDEV (logical device)) provided by the storage apparatus 3, and RAID groups (also referred to as array groups) providing the storage areas of the logical volumes. Dotted lines in FIG. 3 indicate paths settable as I/O paths.

If the resources are configured as shown in FIG. 3, the above resource configuration information includes a correlation between the application and the file system, a correlation between the file system and the volume, a correlation between the volume and the server port 231, a correlation between the server port 231 and the switch port 431, a correlation between the switch port 431 and the storage port 331, a correlation between one switch port 431 and another switch port 431, a correlation between the switch port 431 and the storage port 331, a correlation between the storage port 331 and the logical volume, a correlation between the logical volume and the RAID group, and the like. FIG. 4 depicts an example of resource configuration information (resource configuration information 400).

If the resources are configured as shown in FIG. 3, an I/O path described above is defined (set) by correlating e.g. the application operated in the server apparatus 2, the server port 231, the switch port 431, the storage port 331, and the logical volume.

Figure 5:
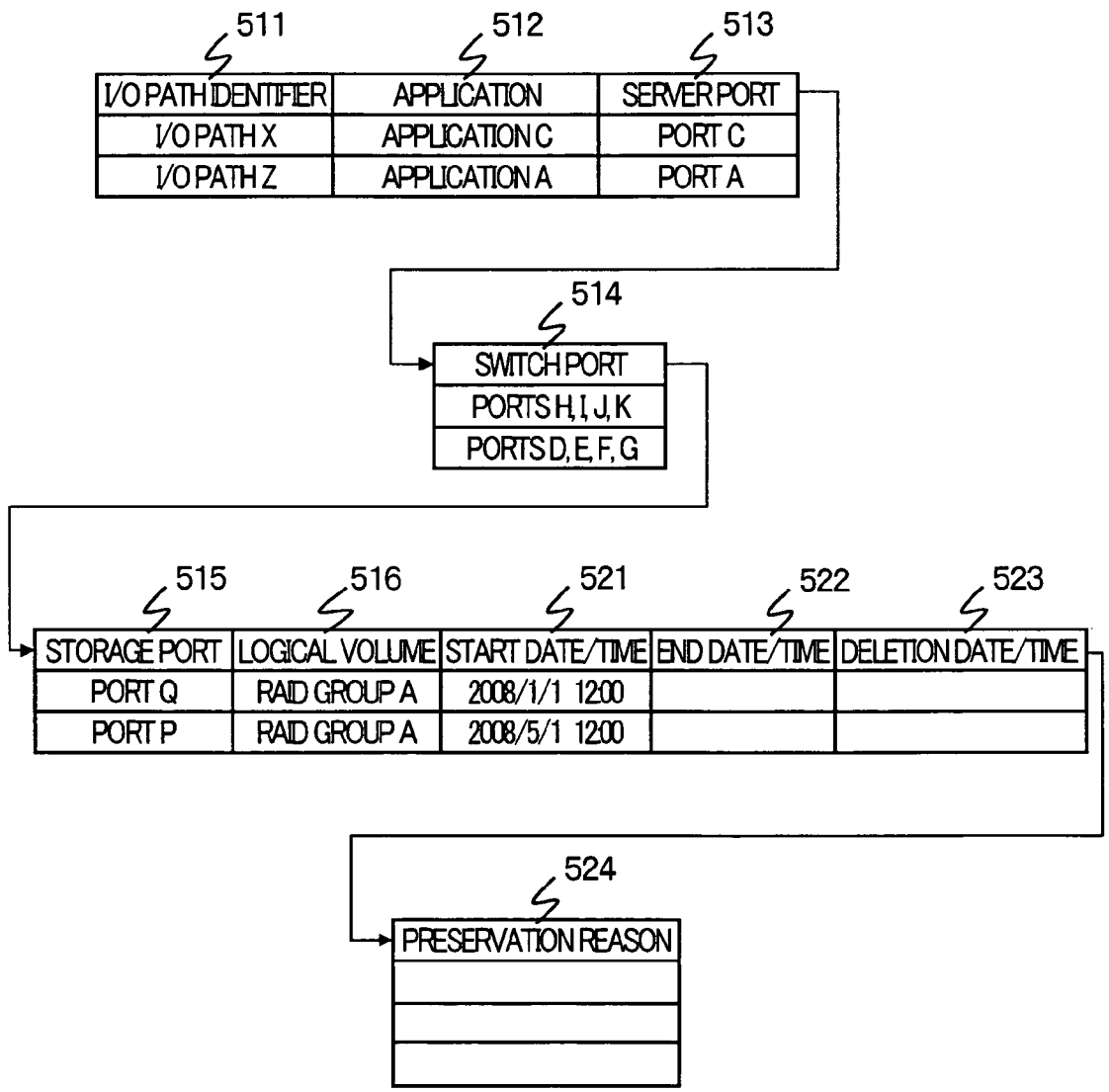
FIG. 5 is a diagram of an example of I/O path definition information 500.

FIG. 5 depicts an example of I/O path definition information. I/O path definition information 500 shown in FIG. 5 defines correlations among I/O path identifiers 511 identifying I/O paths, identifiers 512 of the applications, identifiers 513 of the server ports 231, identifiers 514 of the switch ports 431, identifiers 515 of the storage ports, and identifiers 516 of the logical volumes. Note that FIG. 5 depicts an example of the I/O path defining method and the I/O path defining method is not limited to the one in FIG. 5. The I/O path may be defined as correlations among other resources.

As shown in FIG. 5, a record corresponding to each of the I/O paths in the I/O path definition information 500 has items of start date and time 521 for setting the date and time when the I/O path starts to be used (date and time when an I/O request becomes transmittable with the use of the I/O path), end date and time 522 for setting the date and time when the I/O path goes out of use (date and time when an I/O request becomes unable to be transmitted with the use of the I/O path), and deletion date and time 523 for setting the date and time (timing) when definition information (corresponding record) of the I/O path becomes deletable from the configuration information database 211.

The start date and time 521 are set as the date and time when the I/O path starts to be used (date and time when the configuration information acquiring unit 209 acquires the I/O path definition information 500 of the I/O path). The end date and time 522 are set as the date and time when the usage of the I/O path is terminated (date and time when the configuration information acquiring unit 209 detects that the I/O path definition information 500 of the I/O path becomes invalid). The start date and time 521 and the end date and time 522 may be configured to be set by the monitoring object detecting unit 213 described later. The deletion date and time 523 and a preservation reason 524 will be described later.

The configuration information described above (the resource configuration information 400 and the I/O path definition information 500) is to be changed by an administrator (a user, an operator), etc., of the management object apparatus as needed. The configuration information may be changed, for example, when the number of the server apparatus 2, the switches 4, or the storage apparatuses 3 is increased or decreased, when a change is made in the configuration of the applications, the file systems, or the volumes of the server apparatuses 2 or in the zoning setting of the switches 4, when a change is made in the configuration of the RAID groups or the logical volumes of the storage apparatus 3, and when a change is made in the configuration of the storage system 5 for improving a measure to failure or security performance.

The above-mentioned performance information is information related to performance of individual resources. The performance information indicates, for example, the number of I/O requests per unit time (IOPS (I/O per second)) processed by (or passing through each of) the file system, the volume, or the server port of the server apparatus 2, the number of I/O requests per unit time passing through the switch port of the switch 4, the number of I/O requests per unit time, and the number of I/O requests per unit time processed by (or passing through each of) the storage port, the logical volume, or the RAID group of the storage apparatus 3. FIG. 6A depicts an example of the performance information 600 related to the server apparatuses 2; FIG. 6B depicts an example of the performance information 600 related to the switches 4; and FIG. 6C depicts an example of the performance information 600 related to the storage apparatus 3. In FIGS. 6A to 6C, the performances of the resources are indicated by metrics values based on the number of I/O requests.

For example, SNMP (simple network management protocol) is used for collecting the configuration information by the configuration information providing unit 201 and the configuration information collecting unit 203 as well as for collecting the performance information by the performance information providing unit 202 and the performance information collecting unit 204. In this case, for example, the configuration information collecting unit 203 and the performance information collecting unit 204 function as SNMP managers, while the configuration information providing unit 201 and the performance information providing unit 202 function as SNMP agents. The configuration information or the performance information may be collected with the use of WMI (Microsoft® Windows® management instrumentation), WBEM (web-based enterprise management), SSH (secure shell), SMI-S (storage management initiative-specification), etc.

Upon receipt of the configuration information from the configuration information providing unit 201 of the management object apparatus, the configuration information collecting unit 203 of the information collection server 11 stores the configuration information into the configuration information database 205. Upon receipt of the performance information from the performance information providing unit 202 of the management object apparatus, the performance information collecting unit 204 of the information collection server 11 stores the performance information into the performance information database 206.

The configuration information transmitting unit 207 of the information collection server 11 provides (transmits) the contents of the configuration information database 205 to the configuration information acquiring unit 209 of the performance management server 12 as needed. The performance information transmitting unit 208 of the information collection server 11 provides (transmits) the contents of the performance information database 206 to the performance information acquiring unit 210 of the performance management server 12 as needed.

The configuration information acquiring unit 209 of the performance management server 12 stores the configuration information received (acquired) from the configuration information transmitting unit 207 of the information collection server 11 into the configuration information database 211 of the performance management server 12. The performance information acquiring unit 210 of the performance management server 12 stores the performance information received (acquired) from the performance information transmitting unit 208 of the information collection server 11 into the performance information database 212 of the performance management server 12.

As a result, the contents of the configuration information database 205 of the information collection server 11 are synchronized with the contents of the configuration information database 211 of the performance management server 12. The contents of the performance information database 206 of the information collection server 11 are also synchronized with the contents of the performance information database 212 of the performance management server 12. The function of the information collection server 11 may be given to the performance management server 12. In this case, the configuration information databases 205 and 211 are integrated and the performance information databases 206 and 212 are integrated.

Other main functions of the performance management server 12 shown in FIG. 2 will then be described.

The monitoring object detecting unit 213 of the performance management server 12 compares the configuration information acquired by the configuration information acquiring unit 209 from the information collection server 11 with the configuration information stored in the configuration information database 211 to judge whether a change is made in the configuration of the I/O path in the storage system 5 (whether a change is made in the set I/O path definition information 500). If a change is made in the I/O path definition information 500, the monitoring object detecting unit 213 stores information (hereinafter, resource identifiers) identifying some or all of the resources making up the I/O path that becomes invalid (obsolete) due to the change (hereinafter, invalidated I/O path) into the monitoring object resource database 214 as resources to be monitored.

The monitoring object detecting unit 213 identifies another currently valid I/O path stored in the configuration information database 211 and sharing the resource making up the past I/O path and stores the resource identifiers of some or all of the resources making up the currently valid I/O path identified into the monitoring object resource database 214 as monitoring object resource.

Figure 7:
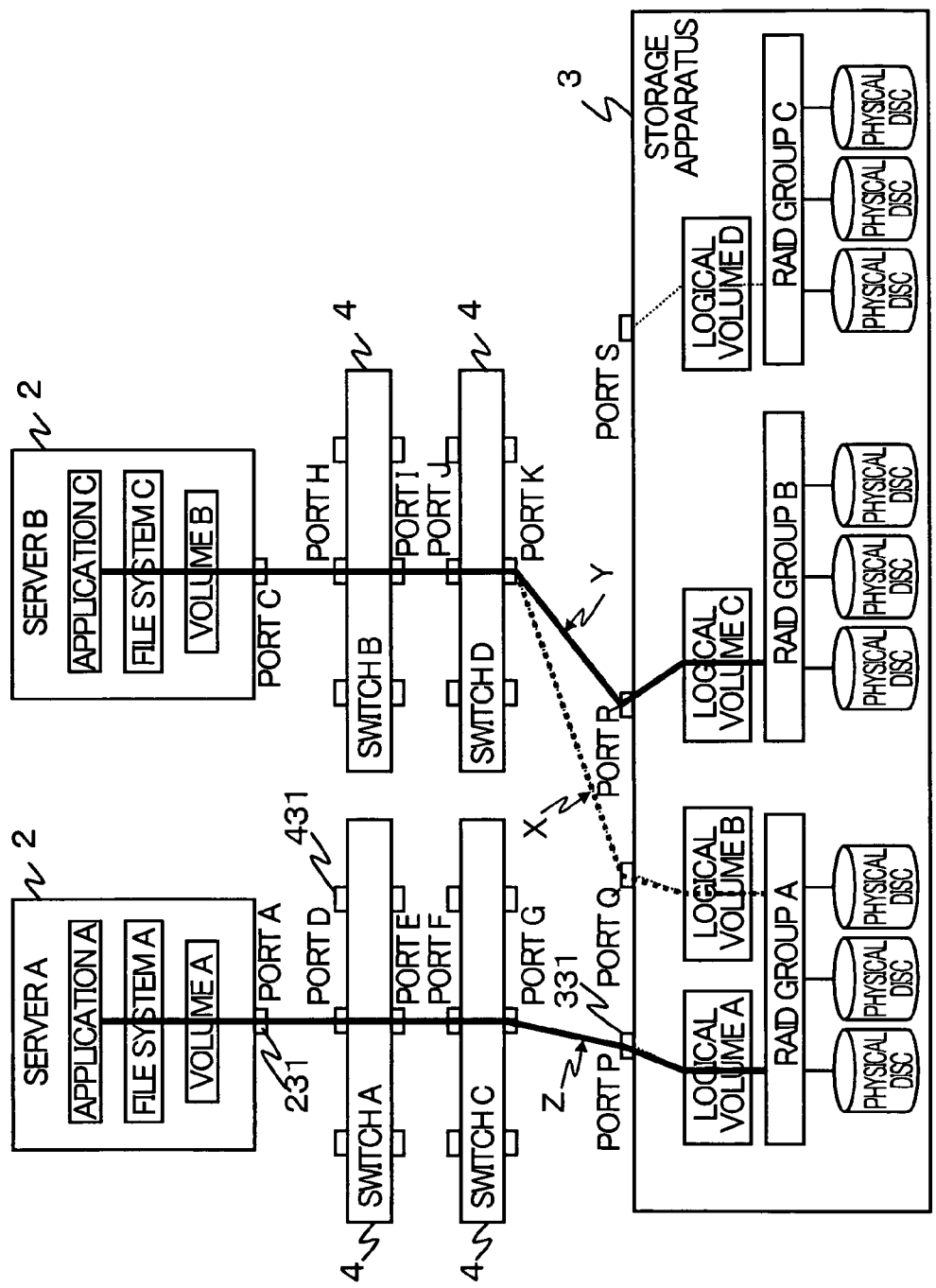
FIG. 7 is an explanatory diagram of a case of changing an I/O path.

Description will specifically be made. FIG. 7 depicts an example when an I/O path is changed. FIG. 7 exemplarily depicts the case that a change to an I/O path Y represented by a heavy solid line is made when an I/O path X represented by a heavy dashed line has been set. As shown in FIG. 7, an I/O path Z represented by a heavy solid line is also set valid in addition to the I/O paths X and Y.

Figure 8A:
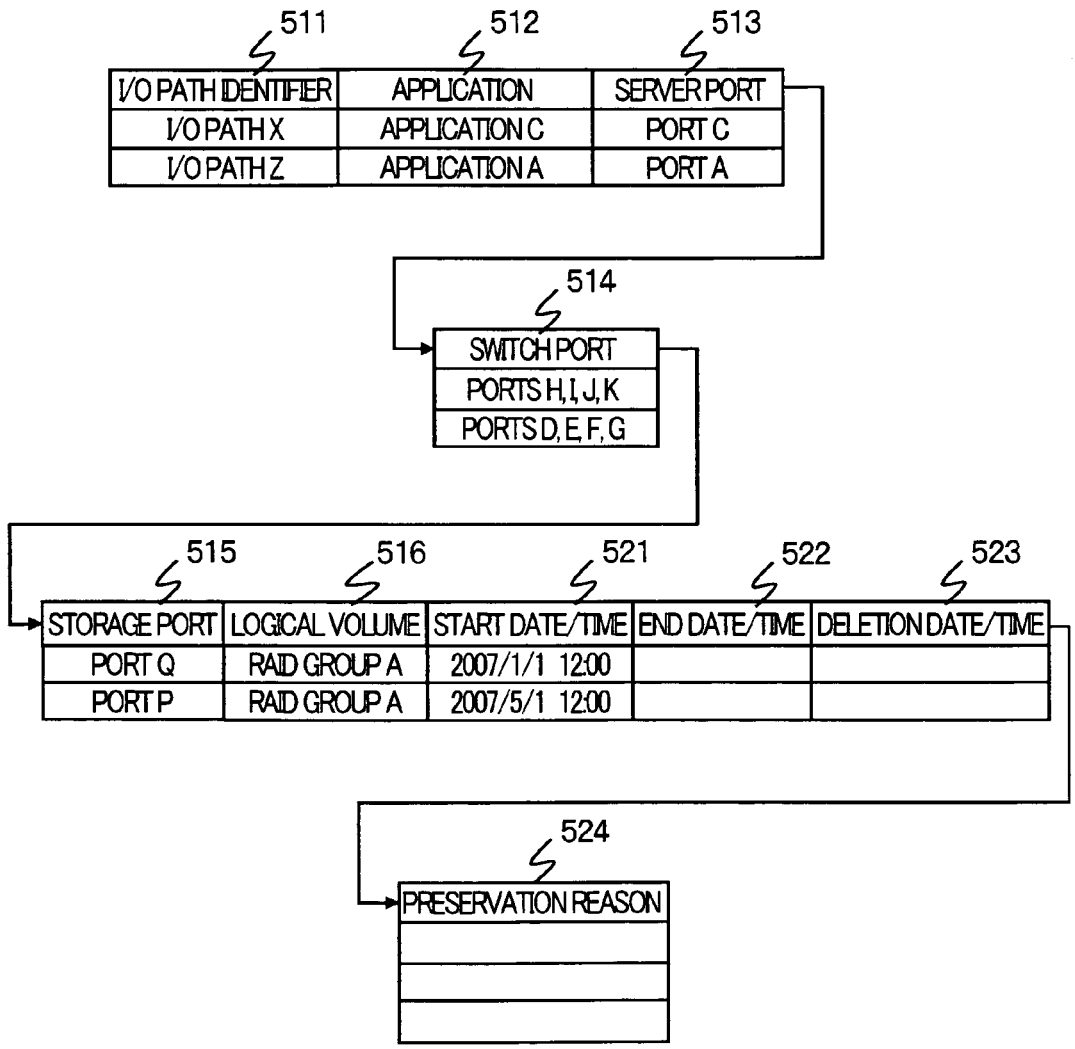
FIG. 8A depicts an example of the I/O path definition information 500 before the I/O path is changed.
Figure 8B:
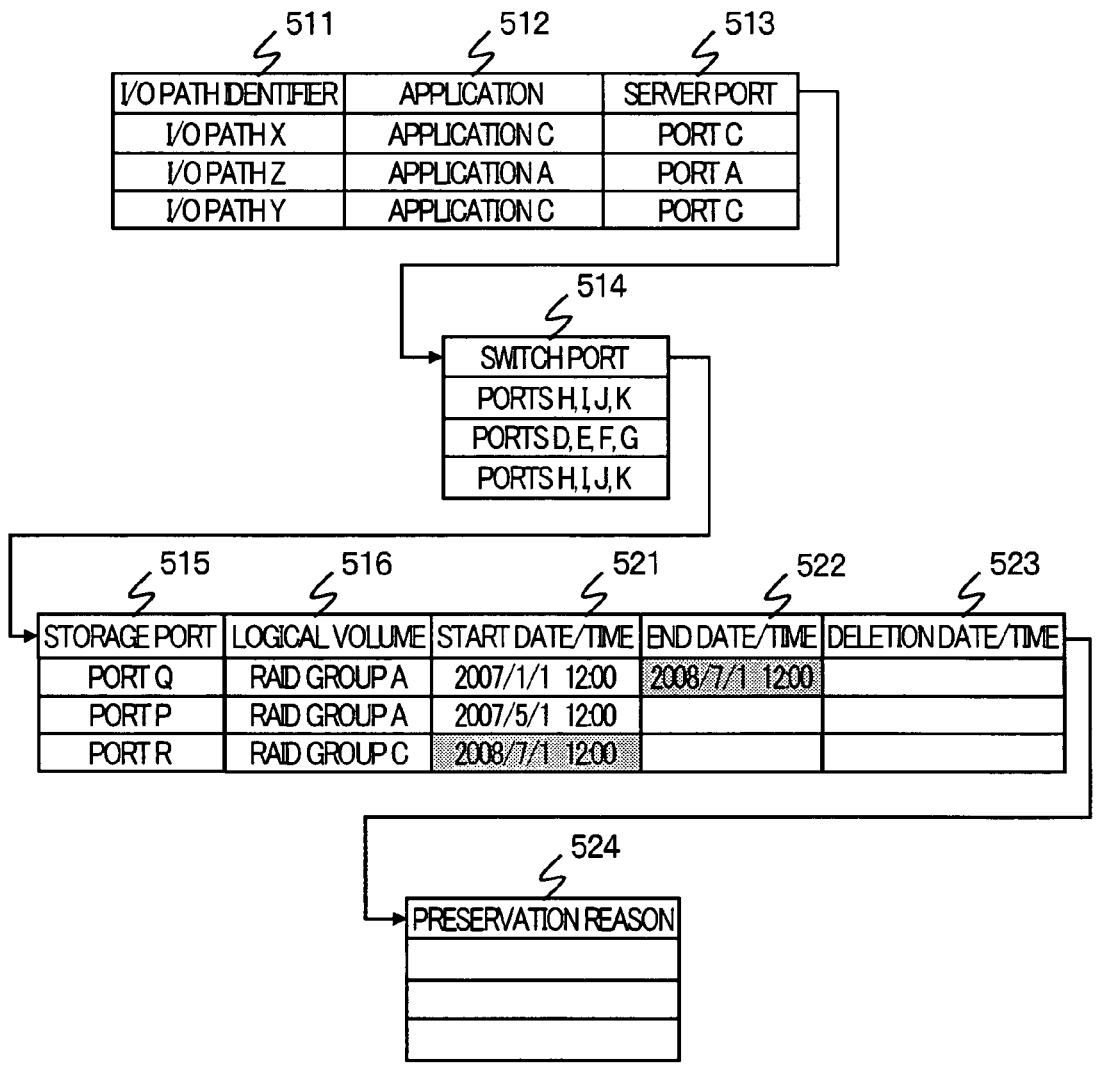
FIG. 8B depicts an example of the I/O path definition information 500 after the I/O path is changed.

FIG. 8A depicts the I/O path definition information 500 before changing the I/O path and FIG. 8B depicts the I/O path definition information 500 after changing the I/O path. As shown in FIGS. 8A and 8B, the I/O path definition information 500 of the I/O path X is defined by correlating an application C, a port C, ports H, I, J, and K, a port Q, and a RAID group A. The I/O path definition information 500 of the I/O path Y is defined by correlating the application C, the port C, the ports H, I, J, and K, a port R, and a RAID group B. The I/O path definition information 500 of the I/O path Z is defined by correlating an application A, a port A, ports D, E, F, and G, a port P, and the RAID group A.

When detecting such a change in the I/O path, the monitoring object detecting unit 213 stores some or all of the resources making up the I/O path X made invalid due to the change into the monitoring object resource database 214 as resources to be monitored (hereinafter, monitoring object resources). That is, the monitoring object detecting unit 213 stores some or all of the resource identifiers of the application C, a file system C, a volume B, the port C, the ports H, I, J, and K, the port Q, a logical volume B, and the RAID group A into the monitoring object resource database 214 as the resources to be monitored.

The monitoring object detecting unit 213 identifies another currently valid I/O path stored in the configuration information database 211 and sharing the resource making up the I/O path X and stores the resource identifiers of some or all of the resources making up the currently valid I/O path identified into the monitoring object resource database 214 as. In FIG.

8B, since the I/O path X shares the resource "RAID group A" with the I/O path Z, the monitoring object detecting unit 213 stores some or all of the resource identifiers of the application C, a file system A, a volume A, the port A, the ports D, E, F, and G, the port Q, and the logical volume A into the monitoring object resource database 214 as the resources to be monitored. FIG. 9 depicts an example of registered contents of the monitoring object resource database 214.

The performance information monitoring unit 215 shown in FIG. 2 acquires the performance information of the resources identified by the resource identifiers stored in the monitoring object resource database 214 from the performance information database 212. The performance information acquired by the performance information monitoring unit 215 is the performance information of the monitoring object resources in a period (hereinafter, valid period) while the invalidated I/O path triggering the resources stored in the monitoring object resource database 214 to turn to the monitoring object resources had been present as a valid path. The performance information stored in the performance information database 212 of the performance management server 12 may be acquired from the information collection server 11 when the performance information monitoring unit 215 acquires the performance information, or may be preliminarily be acquired and stored by the performance information acquiring unit 210 from the performance information transmitting unit 208 of the information collection server 11 at a timing set in advance.

The performance information monitoring unit 215 judges whether the performance information of the monitoring object resources stored in the monitoring object resource database 214 in the valid period matches a policy set in advance by the policy setting unit 221 and inputs the judgement result ("match" or "not match") to the deletion period setting unit 216. The details of the policy will be described later.

A method may arbitrarily be set to judge whether the performance information of the monitoring object resources in the valid period matches the policy. The type and number of policies may also arbitrarily be set. For example, it may be judged that the information is matched when at least one of the monitoring object resources stored in the monitoring object resource database 214 matches one policy or it may be judged that the information is matched when two or more predetermined number of monitoring object resources match one policy. Alternatively, it may be judged that the information is matched when one (or more) piece of the performance information matches a plurality of types of policies.

In this embodiment, for convenience of description, it is judged that the information is "matched" if at least one of the monitoring object resources stored in the monitoring object resource database 214 matches one policy and it is judged that the information is "not matched" if no monitoring object resource matches a policy.

Figure 10:
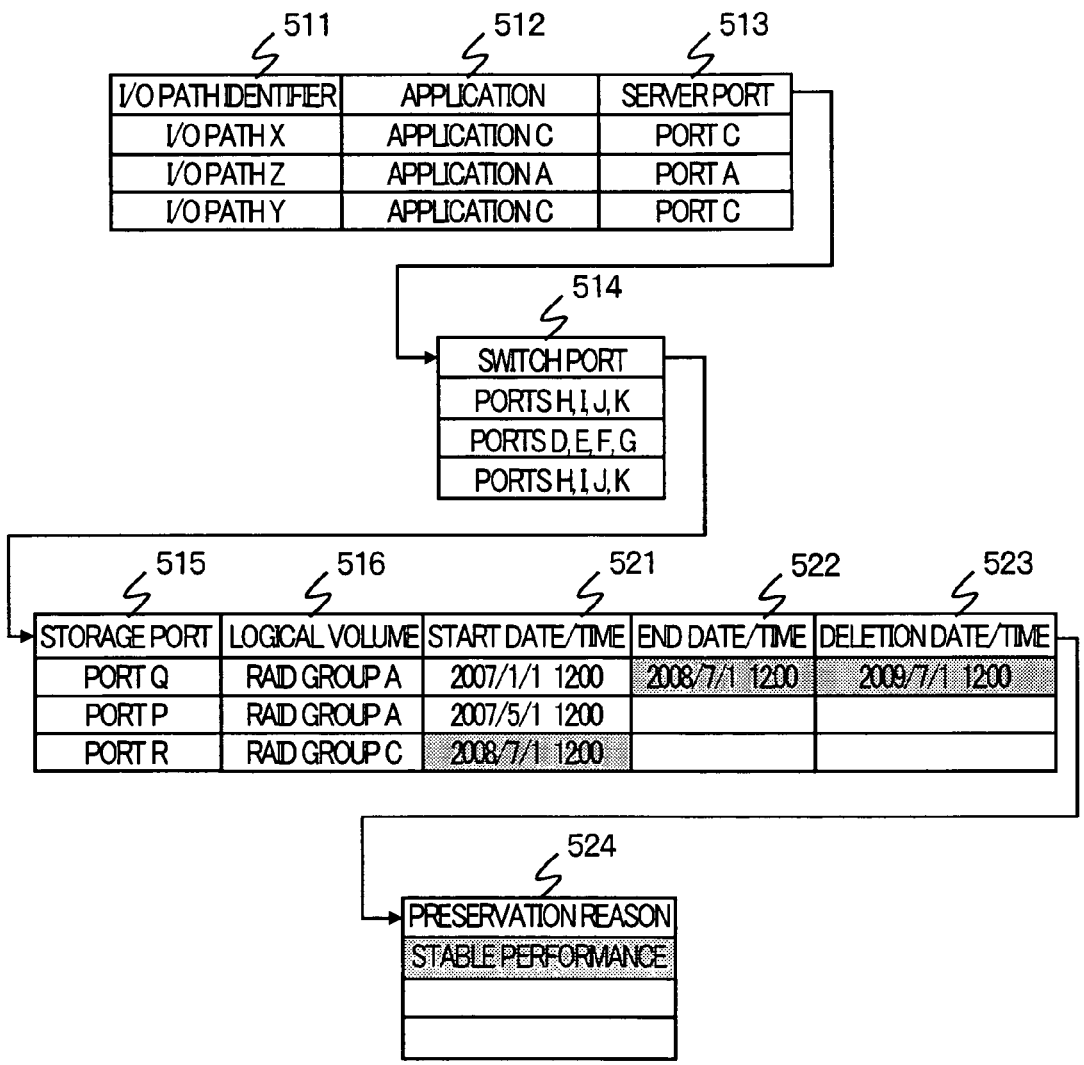
FIG. 10 depicts an example of the I/O path definition information 500 with which deletion date and time are set.

The deletion period setting unit 216 obtains the date and time (hereinafter, deletion date and time) of making the configuration information related to the invalidated I/O path (hereinafter, invalidated configuration information) deletable from the configuration information database 211 based on the judgement result input from the performance information monitoring unit 215 and a preservation period 223 input from the preservation period setting unit 222 and sets the obtained deletion date and time as the deletion date and time 523 of the record of the invalidated I/O path in the I/O path definition information 500. The deletion period setting unit 216 stores the contents of the matched policy as the preservation reason 524 at this timing. FIG. 10 depicts a state that the deletion time and data are set in the record of the I/O path definition information of the I/O path X of the I/O path definition information 500 shown in FIG. 8B.

In this embodiment, the deletion period setting unit 216 subjects the invalidated configuration information to the long-term preservation if the judgement result of the performance information monitoring unit 215 is "matched" and subjects the invalidated configuration information to the short-term preservation if the judgement result of the performance information monitoring unit 215 is "not matched". The method of determining (setting) the preservation period is not limited to the method described in this embodiment. For example, the preservation period may be varied depending on the number of resources matched to the policy or the type and number of policies matched to the resources.

The configuration information deleting unit 217 compares the current date and time with the deletion date and time set as the deletion date and time 523 of the I/O path definition information 500 stored in the configuration information database 211 and deletes the invalidated configuration information of the invalidated I/O path from the configuration information database 211 if the current date and time exceed the deletion date and time. For example, when the I/O path definition information 500 is as shown in FIG. 10, if the current date and time is Jul. 2, 2009, the invalidated configuration information to be deleted at this point is the record of the I/O path X.

Since the resource configuration information for each of the correlation between the switch port K and the storage port Q, the correlation between the storage port Q and the logical volume B, and the correlation between the logical volume B and the RAID group A are also the invalidated configuration information as shown in FIG. 7, the configuration information deleting unit 217 deletes these pieces of information from the configuration information database 211. When deleting the configuration information from the configuration information database 211, the performance information related to the resources included in the configuration information may be deleted from the performance information database 212.

As above, the performance management server 12 of this embodiment makes a judgment based on whether the performance of the monitoring object resource matches the policy. Therefore, the configuration information needed to be preserved for a longer term is certainly preserved for a necessary period and the configuration information needed to be preserved only for a shorter term is shortly deleted from the configuration information database 211. Therefore, a limited storage area of the configuration information database 211 may effectively be utilized.

Figure 11:
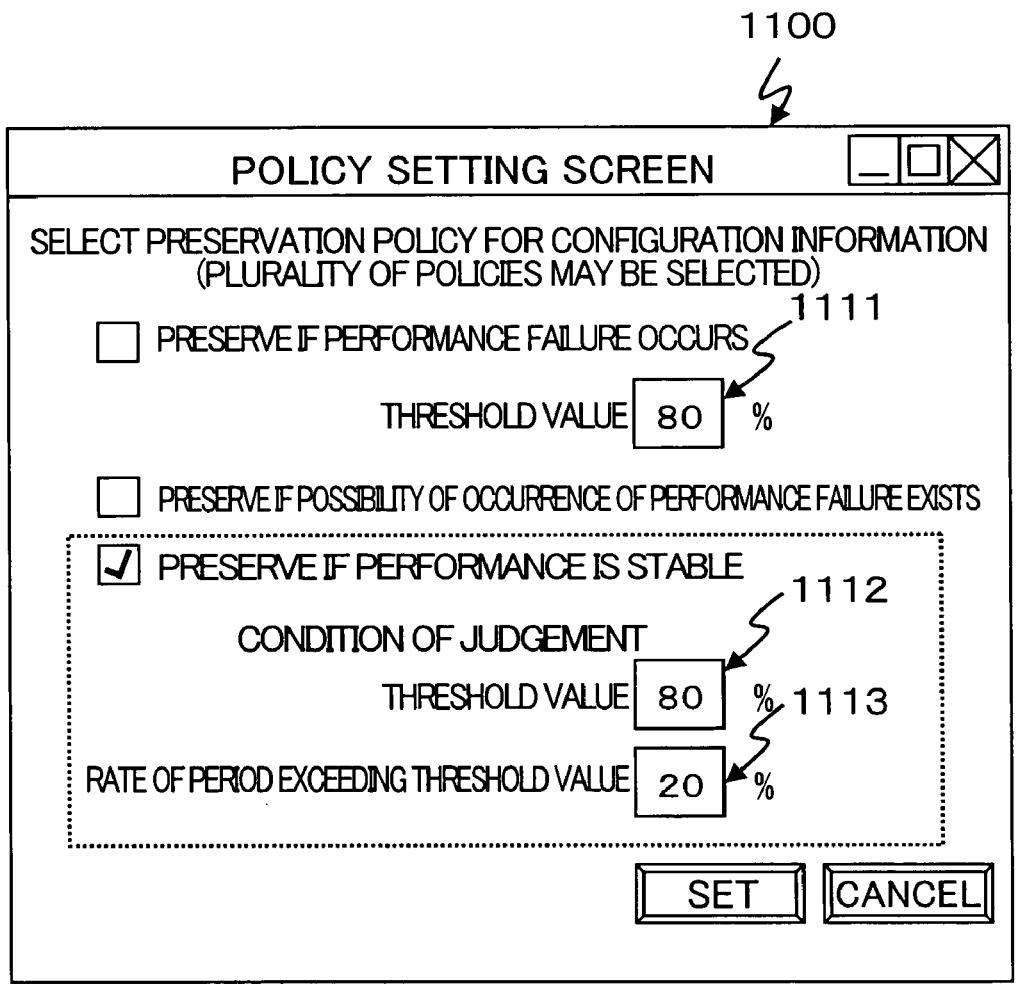
FIG. 11 depicts an example of a policy setting screen 1100.

The policy setting unit 221 provides a user interface for setting the above policy and inputs the set policy to the performance information monitoring unit 215. FIG. 11 depicts an example of a screen (hereinafter, a policy setting screen 1100) provided as the user interface by the policy setting unit 221. As shown in FIG. 11, a user may set one or more of the following policies on the policy setting screen 1100:

(1) the invalidated configuration information is preserved if a performance failure occurs in the monitoring object resources;

(2) the invalidated configuration information is preserved if a possibility of occurrence of a performance failure exists in the monitoring object resources; and (3) the invalidated configuration information is preserved if the performance of the monitoring object resources is stable.

The policy of (1) (first policy) represents a policy that the invalidated configuration information is subjected to long-term preservation if a performance failure occurs in at least one of the monitoring object resources stored in the monitoring object resource database 214.

Figure 12A:
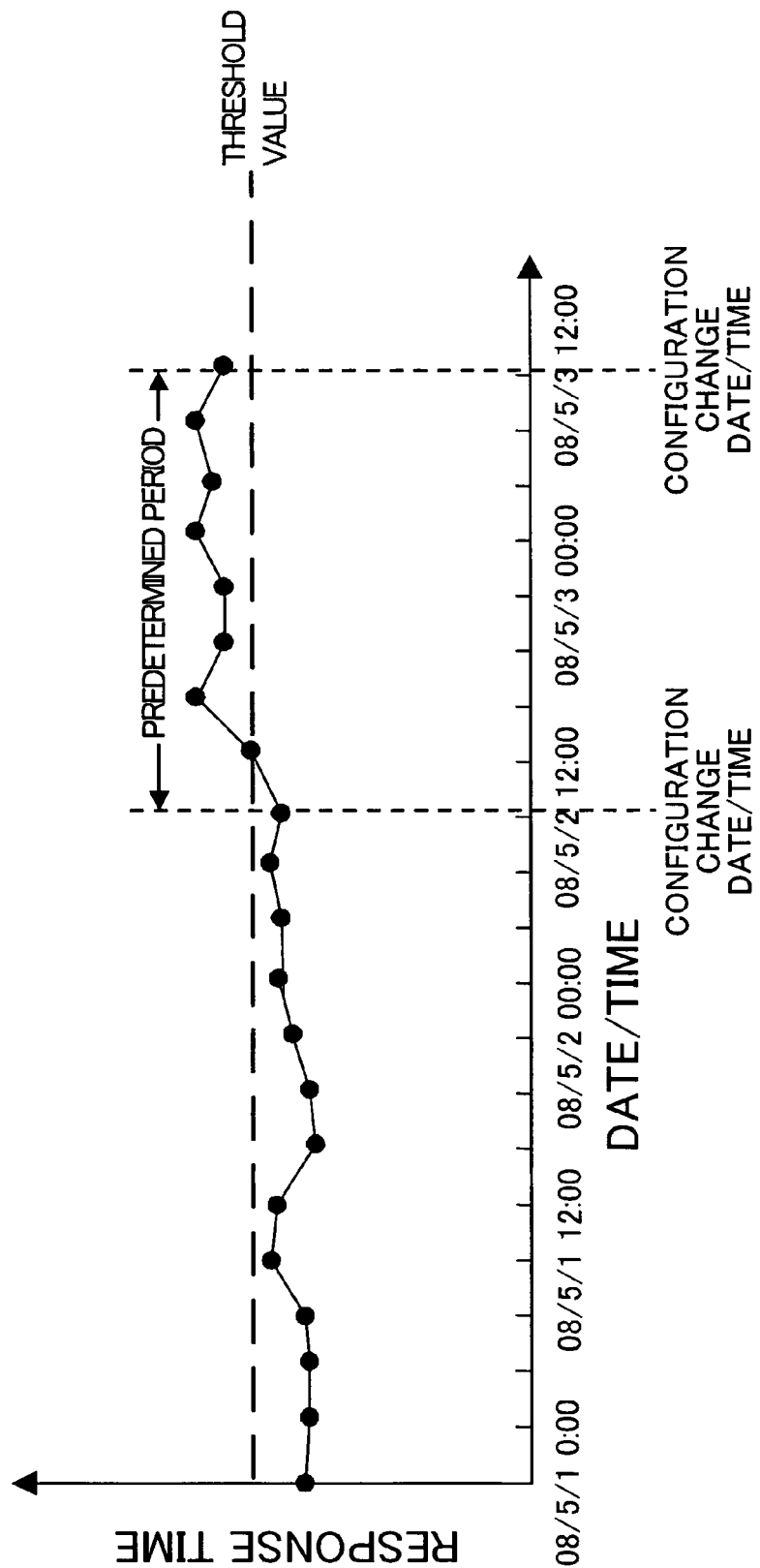
FIG. 12A is an explanatory diagram of an example of a policy.

If this policy is set, the performance information monitoring unit 215 judges whether the monitoring object resource matches the policy in the following manner, for example. As shown in FIG. 12A, the performance information monitoring unit 215 judges that the policy is matched if the metrics value of the monitoring object resource exceeds a preset threshold value in a predetermined period.

The predetermined period is, for example, from the date and time when the invalidated I/O path became valid (configuration change date and time) to the date and time when the invalidated I/O path has become invalidated (configuration change date and time). The monitoring object resource is, for example, an application making up the invalidated I/O path, and the metrics value is a metrics value based on a response time (turn-around time) of an I/O request issued from the application to the storage apparatus 3. The threshold value may be set by a user on the policy setting screen 1100 (e.g., set in an input field denoted by a reference numeral 1111 of FIG. 11).

As above, if the policy of (1) is set, the invalidated configuration information is subjected to long-term preservation when a performance failure occurs in the monitoring object resources. Therefore, the effective configuration information for analyzing a cause of a performance failure may certainly be left in the configuration information database 211.

The policy of (2) (second policy) represents a policy that the invalidated configuration information is subjected to long-term preservation if a possibility of occurrence of a performance failure exists in at least one of the monitoring object resources stored in the monitoring object resource database 214.

Figure 12B:
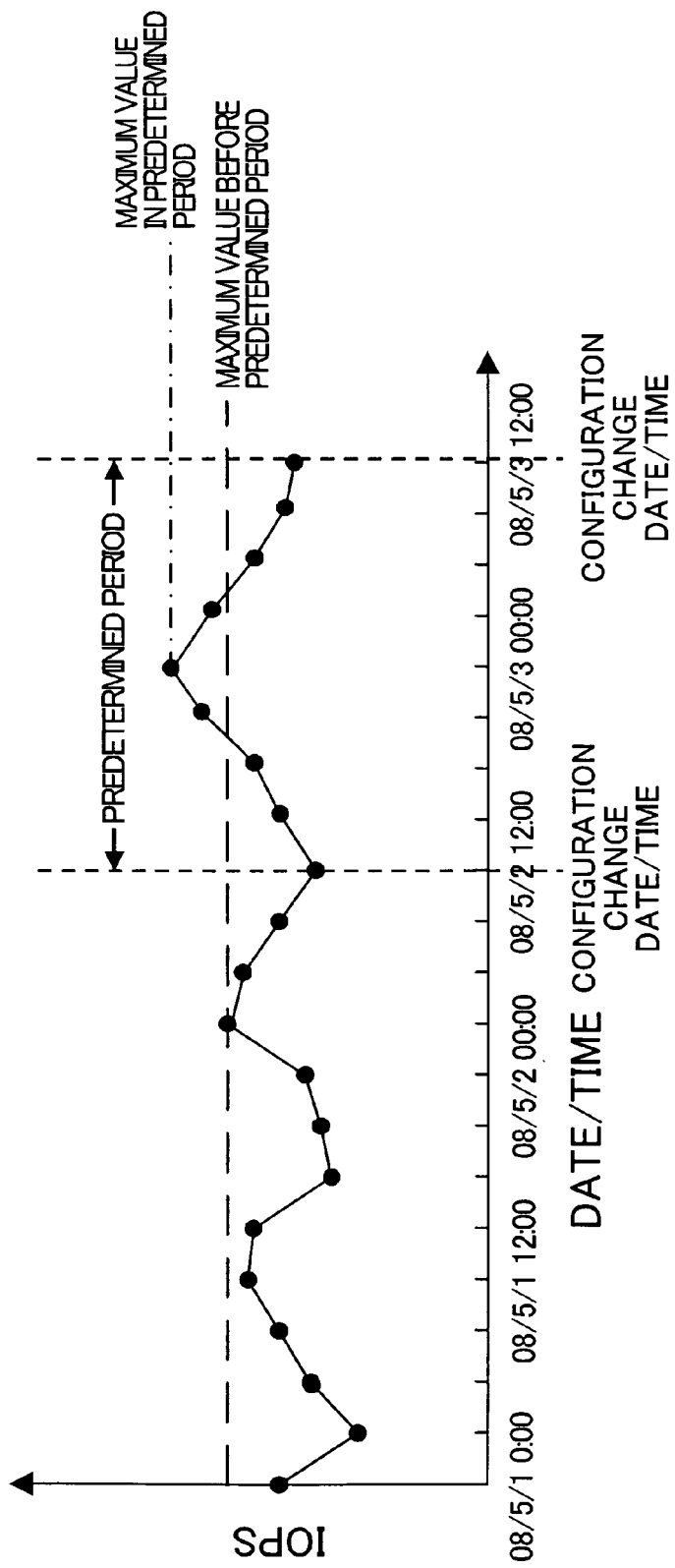
FIG. 12B is an explanatory diagram of an example of a policy.

If this policy is set, the performance information monitoring unit 215 judges whether the monitoring object resource matches the policy in the following manner, for example. As shown in FIG. 12B, the performance information monitoring unit 215 judges that the policy is matched if the metrics value of the monitoring object resource in a predetermined period exceeds the maximum value of the metrics recorded before the predetermined period.

The predetermined period is, for example, from the date and time when the invalidated I/O path became valid (configuration change date and time) to the date and time when the invalidated I/O path has become invalidated (configuration change date and time). The monitoring object resource is, for example, the storage port 331 making up the invalidated I/O path, and the metrics value is a metrics value based on an I/O processing amount (IOPS) of the storage port 331.

As above, if the policy of (2) is set, the invalidated configuration information is subjected to long-term preservation when a possibility of occurrence of a performance failure exists in the monitoring object resources. Therefore, the effective configuration information for analyzing a cause of a performance failure may certainly be left in the configuration information database 211.

The policy of (3) (third policy) represents a policy that the invalidated configuration information is subjected to long-term preservation if the performance of at least one of the monitoring object resources stored in the monitoring object resource database 214 is stable.

Figure 12C:
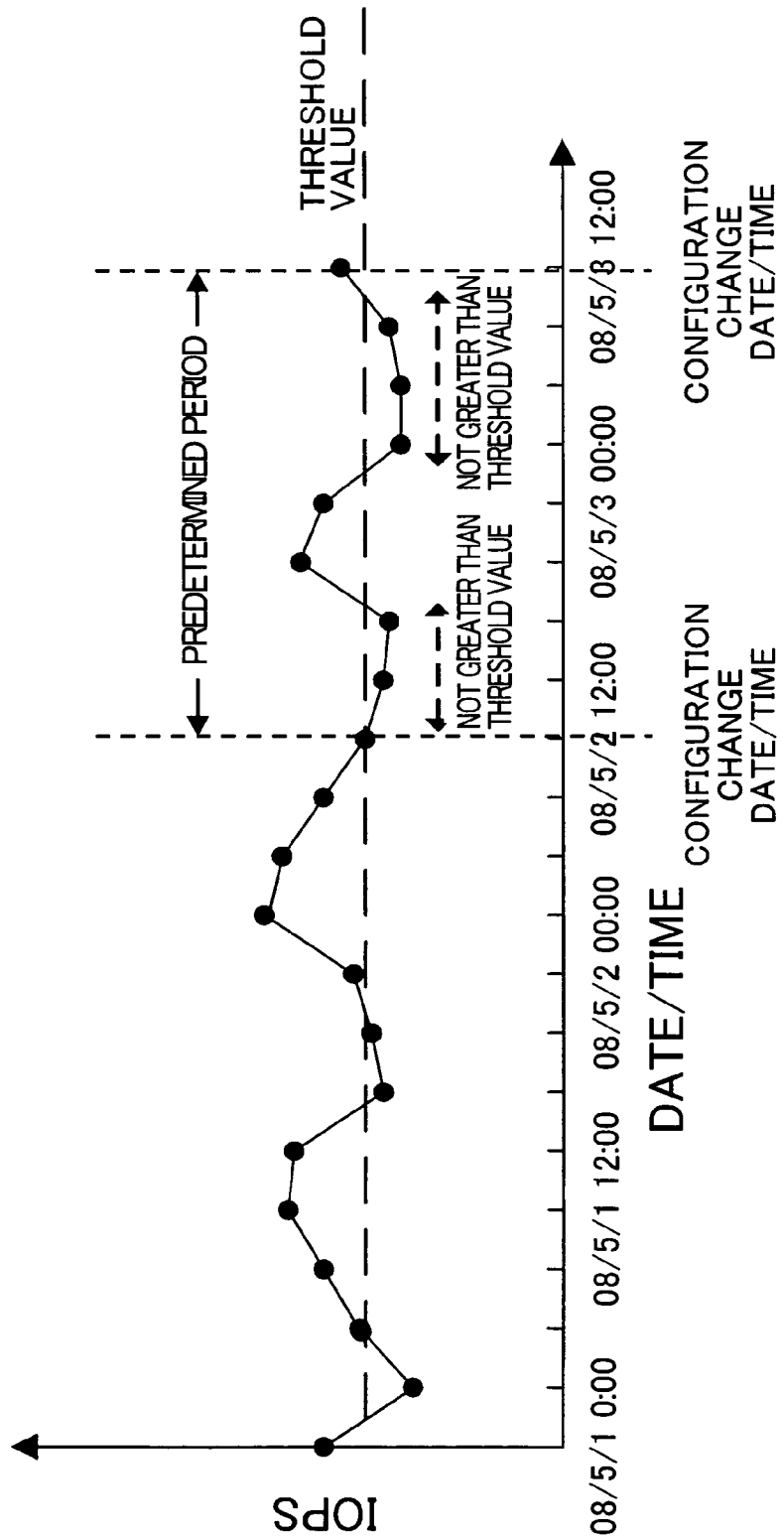
FIG. 12C is an explanatory diagram of an example of a policy.

If this policy is set, the performance information monitoring unit 215 judges whether the monitoring object resource matches the policy in the following manner, for example. As shown in FIG. 12C, the performance information monitoring unit 215 judges that the policy is matched if a ratio of a period having the metrics value of the monitoring object resource exceeding a preset first threshold value to a whole predetermined period exceeds a second threshold value.

The predetermined period is, for example, from the date and time when the invalidated I/O path became valid (configuration change date and time) to the date and time when the invalidated I/O path has become invalidated (configuration change date and time). The monitoring object resource is, for example, the storage port 331 making up the invalidated I/O path, and the metrics value is a metrics value based on an I/O processing amount (IOPS) of the storage port 331. The first and second threshold values may be set by a user on the policy setting screen 1100 (e.g., set in input fields denoted by reference numerals 1112 and 1113 of FIG. 11).

As above, if the policy of (3) is set, the invalidated configuration information is subjected to long-term preservation when the performance of the monitoring object resources is stable (when monitoring object resources are effectively utilized). Therefore, the useful configuration information for effectively utilizing the resources may certainly be left in the configuration information database 211.

The three policies described above are only examples and the aspects of the policy are not limited to those described above.

The preservation period setting unit 222 shown in FIG. 2 provides a user interface for setting the preservation period 223 used when the deletion period setting unit 216 obtains the deletion date and time and inputs the set preservation period 223 to the deletion period setting unit 216. The deletion period setting unit 216 defines the deletion date and time as the date and time obtained by adding the preservation period 223 to the date and time (hereinafter, end date and time) set as the end date and time 522 of the I/O path definition information 500.

Figure 13:
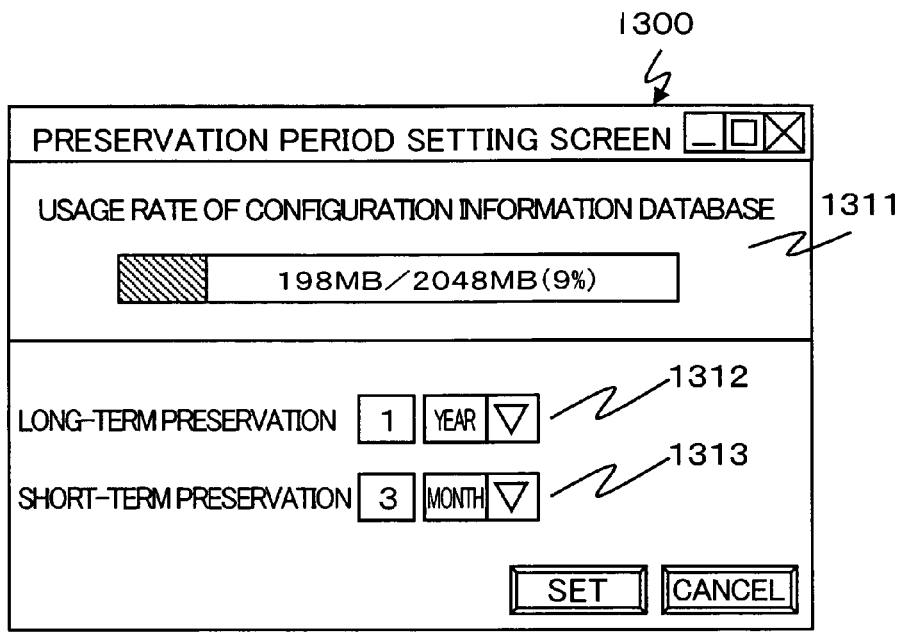
FIG. 13 depicts an example of a preservation period setting screen 1300.

FIG. 13 depicts an example of a screen (hereinafter, preservation period setting screen 1300) provided by the preservation period setting unit 222 to the management client 13 as the user interface. As shown in FIG. 13, the preservation period setting screen 1300 is provided with a display field of a current capacity usage rate of the configuration information database 211 and preservation period setting fields (a preservation period setting field 1212 for the long-term preservation and a preservation period setting field 1213 for the short-term preservation). The preservation period set in the setting field 1212 for the long-term preservation is used for obtaining the deletion period to be set for the invalidated configuration information judged as "matching" the policy by the performance information monitoring unit 215. The preservation period set in the setting field 1213 for the short-term preservation is used for obtaining the deletion period to be set for the invalidated configuration information judged as "not matching" the policy by the performance information monitoring unit 215.

As above, a user may freely set the period for the long-term preservation and the short-term preservation. Therefore, the management server 12 of this embodiment may manage the invalidated configuration information and the configuration information database 211 in accordance with the user's needs.

The display object setting unit 241 provides a user interface for specifying the configuration information or the performance information to be displayed when a user refers to the configuration information stored in the configuration information database 211 or the performance information stored in the performance information database 212.

Figure 14:
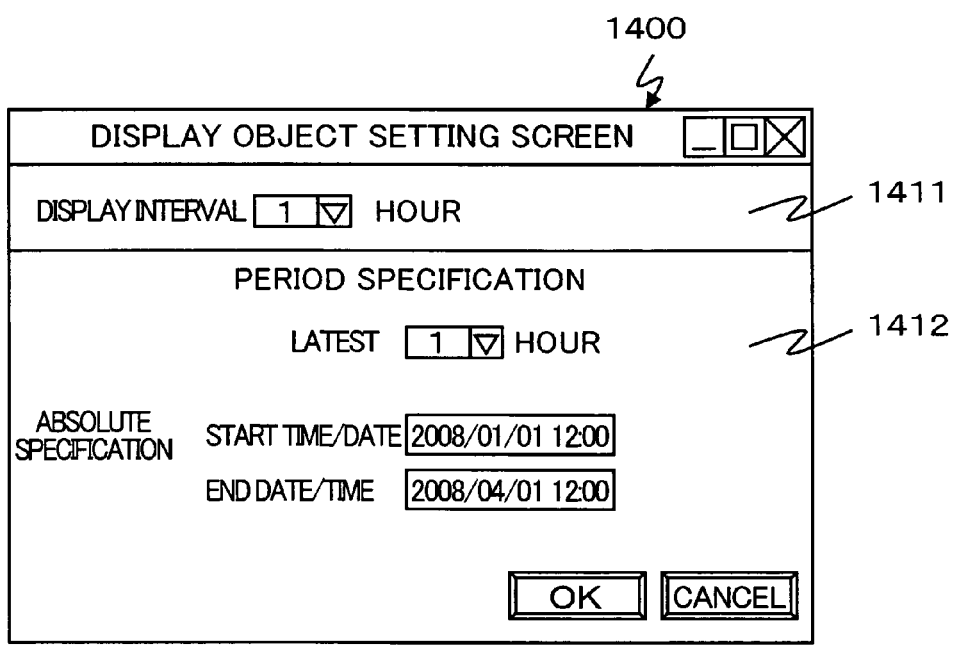
FIG. 14 depicts an example of a display object setting screen 1400.

FIG. 14 depicts an example of a screen (hereinafter, display object setting screen 1400) provided to the management client 13 as the user interface. As shown in FIG. 14, the display object setting screen 1400 is provided with a field 1411 for specifying a display time interval of the performance information and a field 1412 for specifying the performance information to be displayed by a period. The display object setting unit 241 acquires a search condition for the configuration information or the performance information to be displayed through the display object setting screen 1400 from a user.

The configuration information displaying unit 242 shown in FIG. 2 acquires from the configuration information database 211 the configuration information corresponding to the search condition acquired by the display object setting unit 241 and provides a screen describing the acquired configuration information to the management client 13. On the other hand, the performance information displaying unit 243 shown in FIG. 2 acquires from the performance information database 212 the configuration information corresponding to the search condition acquired by the display object setting unit 241 and provides a screen describing the acquired performance information to the management client 13.

Figure 15A:
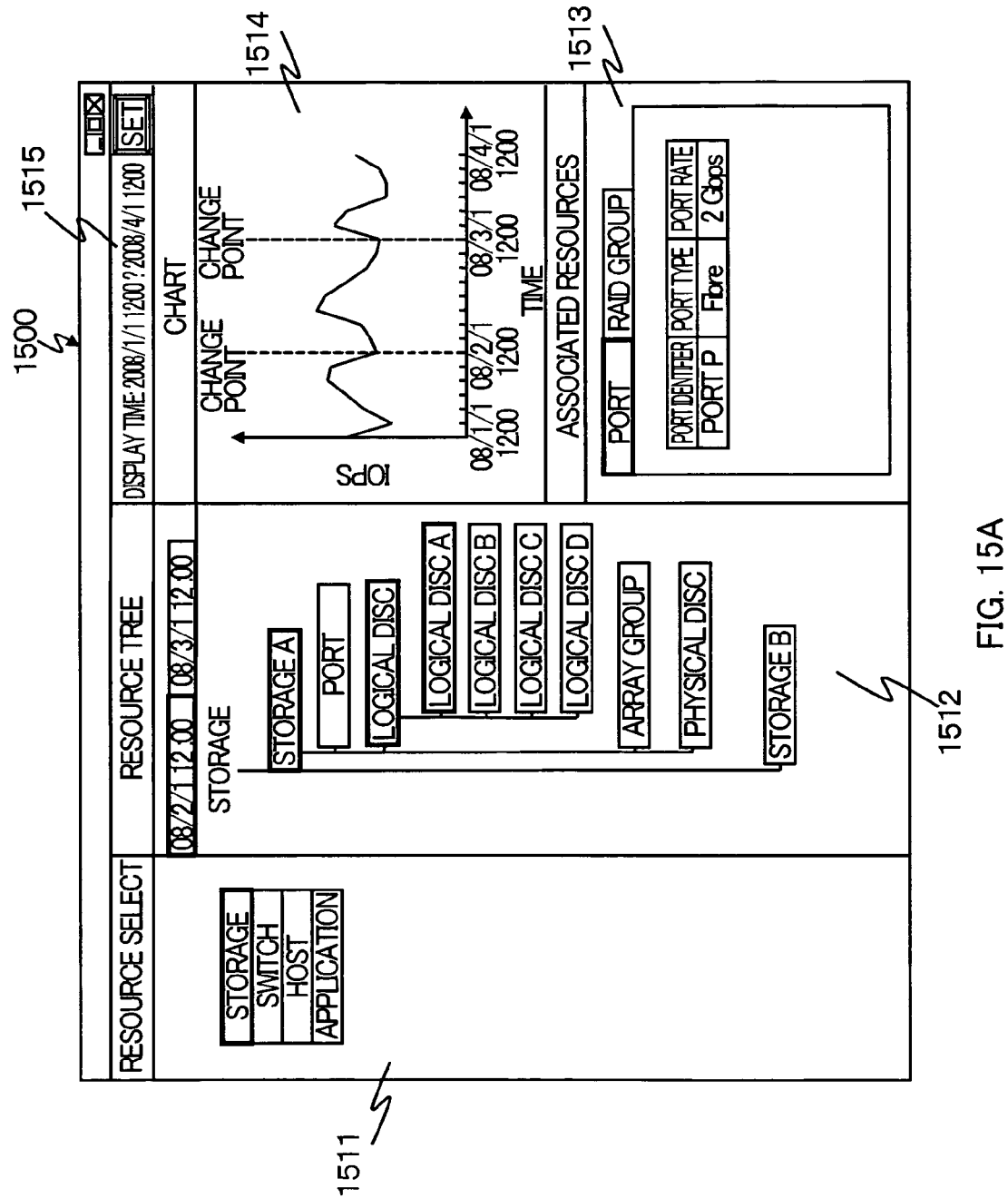
FIG. 15A depicts an example of an information viewing screen 1500.

FIG. 15A depicts an example of a screen (hereinafter, information viewing screen 1500) describing the configuration information and the performance information provided to the management client 13 by the configuration information displaying unit 242 and the performance information displaying unit 243. As shown in FIG. 15A, the information viewing screen 1500 is provided with a resource selecting field 1511, a resource tree display field 1512, an associated resource display field 1513, a performance information display field 1514, and a date/time setting field 1515. The resource selecting field 1511, the resource tree display field 1512, and the associated resource display field 1513 display the configuration information. The performance information display field 1514 displays the performance information.

When an arbitrarily resource is selected in the resource selecting field 1511, the configuration information corresponding to the selected resource is displayed in the resource tree display field 1512. When a date/time tab displayed (tabbed) in the resource tree display field 1512 is selected, the resource tree display field 1512 displays the configuration information at the time point corresponding to the date and time displayed on the date/time tab. When an arbitrary resource is selected in the resource tree display field 1512, resources associated to the selected resource are displayed in the associated resource display field 1513. By selecting a configuration tab displayed in the associated resource display field 1513, the resources displayed in the associated resource display field 1513 may be switched.

The performance information display field 1514 displays the performance information in a period corresponding to the contents specified on the display object setting screen 1400. The resource displayed on the performance information display field 1514 is switched in conjunction with the resource selecting operation in the resource tree display field 1512. When an arbitrary portion of the chart (graph) displayed in the performance information display field 1514 is selected, the configuration information corresponding to the selected date and time is displayed in the resource tree display field 1512 and the associated resource display field 1513. When date and time are set in the date/time setting field 1515, the performance information in a period corresponding to the date and time is displayed in the performance information display field 1514.

As above, according to the performance management server 12 of this embodiment, a user can easily refer to the configuration information or the performance information. A user can refer to the configuration information or the performance information from various viewpoints or perspectives.

Figure 15B:
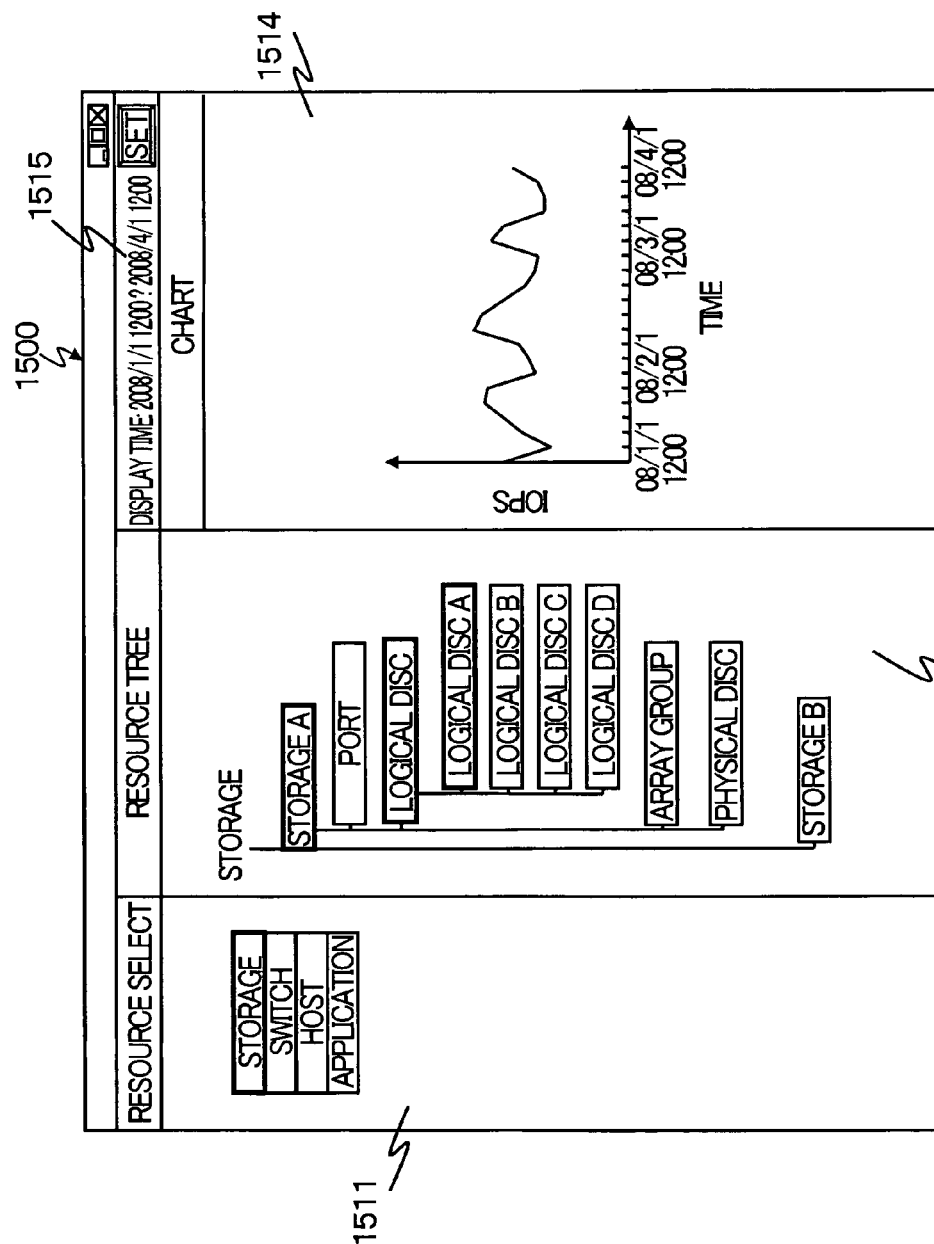
FIG. 15B depicts an example of the information viewing screen 1500.

FIG. 15B depicts another example of the information viewing screen 1500. The information viewing screen 1500 shown in FIG. 15B is not provided with the associated resource display field 1513 in the information viewing screen 1500 shown in FIG. 15A. The resource tree display field 1512 is not provided with the date/time tab. The information viewing screen 1500 may have a simple configuration like this.

Figures 16A, 16B:
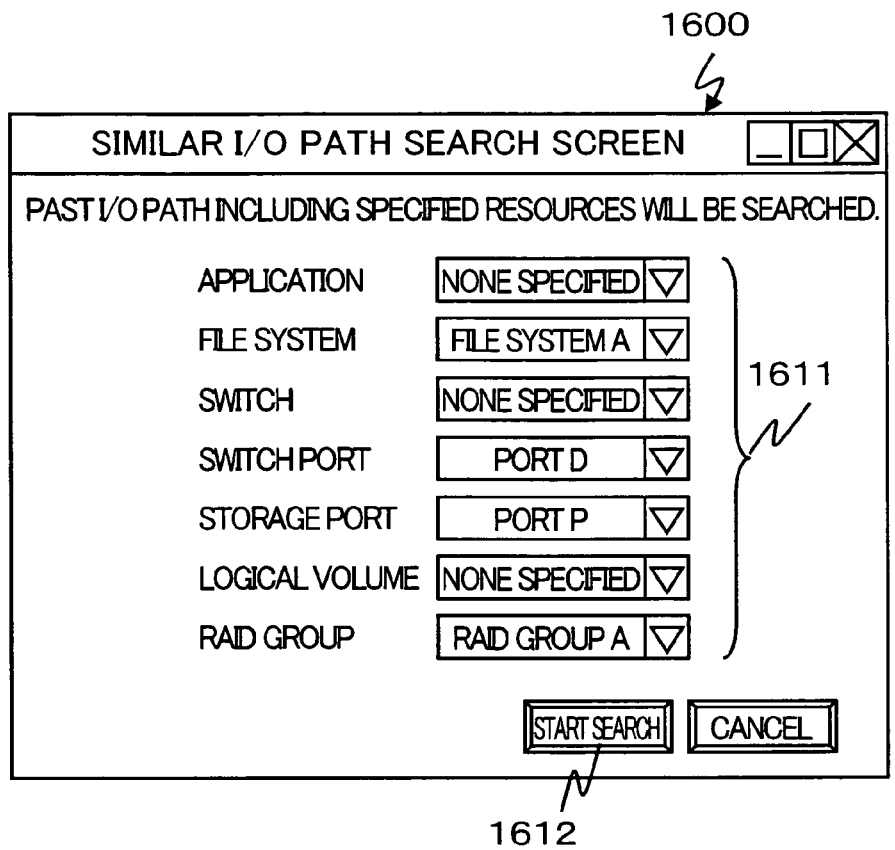
FIG. 16A depicts another example of the display object setting screen 1400.
FIG. 16B depicts an example of an I/O path list screen 1650.

FIG. 16A depicts another aspect of the display object setting screen 1400 provided as a user interface to the management client 13 by the display object setting unit 241. The display object setting unit 241 accepts specification of a combination of identifiers of resources from a user through this screen (hereinafter, similar I/O path search screen 1600) and uses the accepted combination as a search key to display a list of invalidated I/O paths stored in the configuration information database 211.

FIG. 16B depicts a screen (hereinafter, I/O path list screen 1650) displayed when a search start button 1612 is selected after a user specifies a combination of identifiers of resources in specifying fields 1611 of the similar I/O path search screen 1600 shown in FIG. 16A. As shown in FIG. 16B, the I/O path list screen 1650 displays start date and time 1652 (contents of the start date and time 521 of the I/O path definition information 500), end date and time 1653 (contents of the end date and time 522 of the I/O path definition information 500), and a preservation reason 1654 (contents of the preservation reason 524 of the I/O path definition information 500) for each of invalidated I/O path identifiers 1651.

When one of the records displayed on the I/O path list screen 1650 is selected, a screen as shown in FIG. 15A or FIG. 15B is displayed with the display of contents corresponding to the invalidated I/O path of the selected record.

As above, according to the performance management server 12 of this embodiment, a user may easily refer to the configuration information or the performance information related to the I/O paths related (similar) to specified identifiers by specifying the identifiers of resources.

<Description of Processes>

The principal processes executed in the performance management server 12 will then be described. A letter "S" added to the beginning of reference numerals stands for a step.

Figure 17:
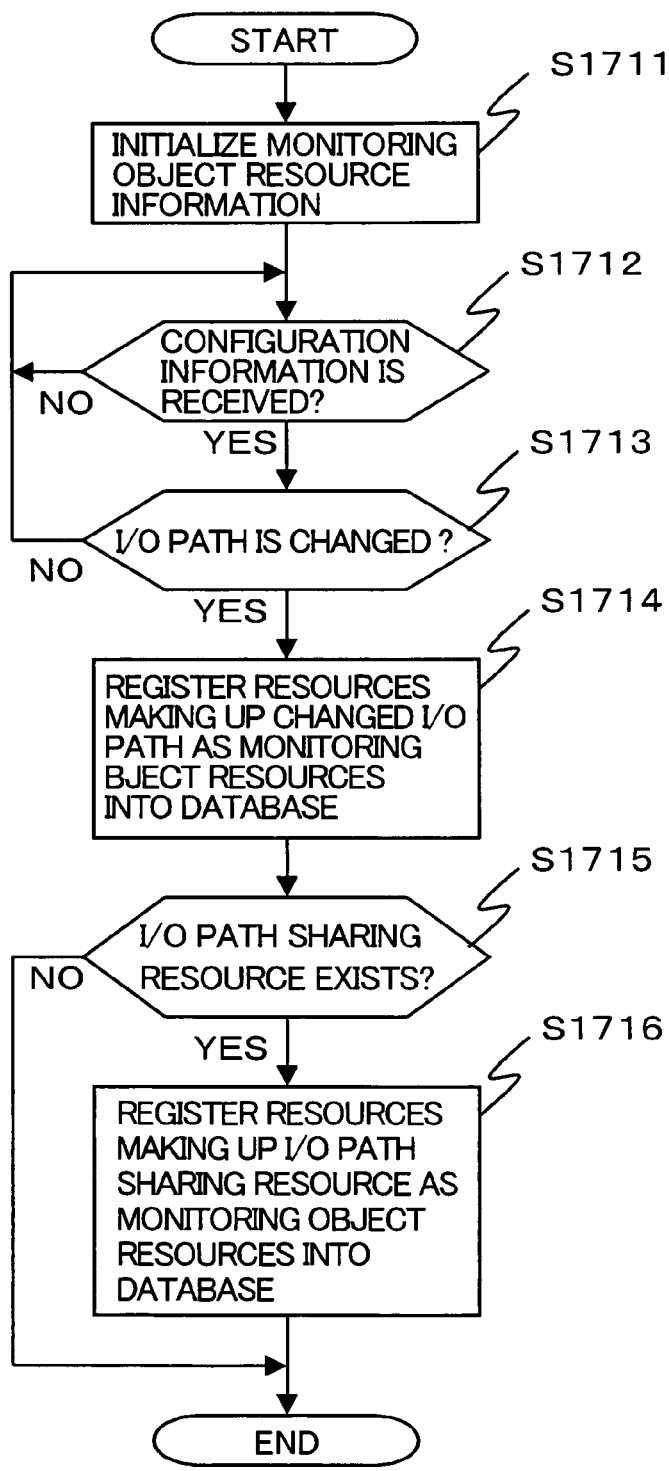
FIG. 17 is an explanatory flowchart of a monitoring object detecting process S1700.

FIG. 17 is an explanatory flowchart of a process (hereinafter, a monitoring object detecting process S1700) executed by the monitoring object detecting unit 213. The monitoring object detecting process S1700 will hereinafter be described with reference to FIG. 17.

The monitoring object detecting unit 213 first deletes (initializes) information stored in the monitoring object resource database 214 (S1711) and starts monitoring whether the configuration information acquiring unit 209 receives the configuration information (S1712).

If the configuration information acquiring unit 209 receives the configuration information (S1712: YES), the monitoring object detecting unit 213 judges whether the I/O path is changed (S1713). If the I/O path is changed, a reference is made to the I/O path definition information of the invalidated I/O path stored in the configuration information database 211 to store (register) resources making up the invalidated I/O path as the monitoring object resources into the monitoring object resource database 214 (S1714).

Next, the configuration information acquiring unit 209 refers to the I/O path definition information stored in the configuration information database 211 to search for an I/O path sharing a resource with the invalidated I/O path (S1715).

If an I/O path sharing a resource exists (S1715: YES), the resources of the I/O path are stored (registered) as the monitoring object resources into the monitoring object resource database 214 (S1716). The monitoring object detecting process S1700 is basically executed as above.

Figure 18:
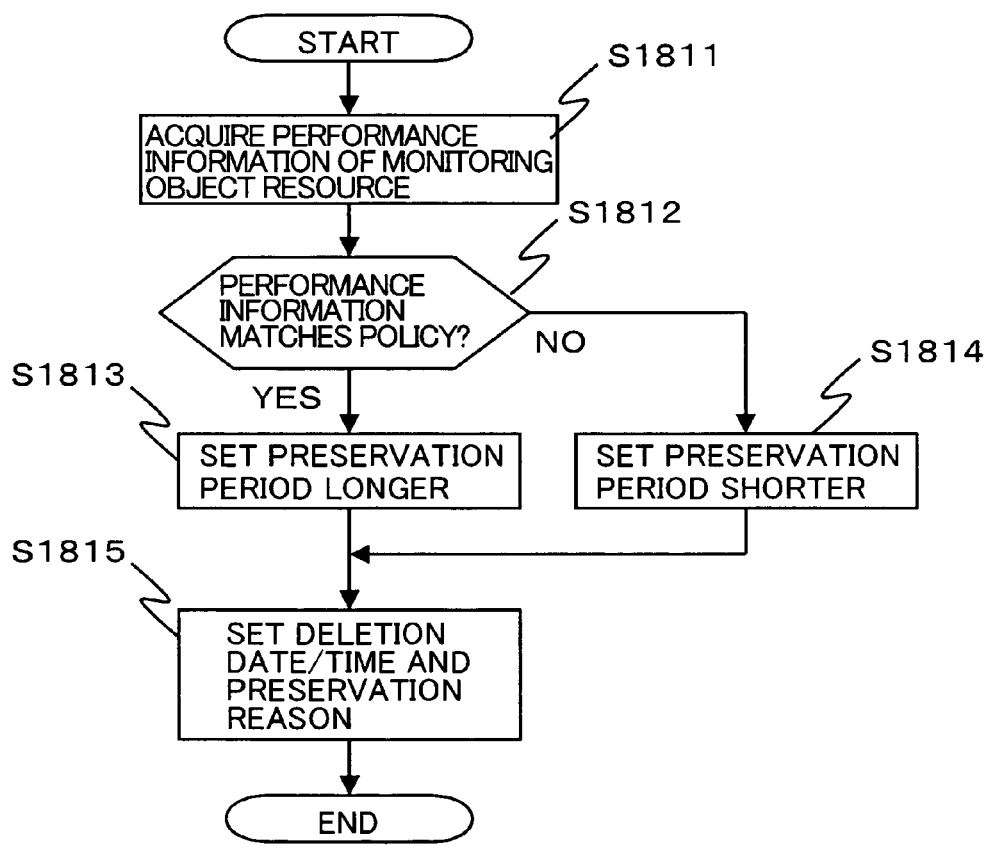
FIG. 18 is an explanatory flowchart of a deletion period setting process S1800.

FIG. 18 is an explanatory flowchart of a process (hereinafter, a deletion period setting process S1800) executed by the deletion period setting unit 216. The deletion period setting process S1800 will hereinafter be described with reference to FIG. 18.

The performance information monitoring unit 215 first acquires the performance information of the monitoring object resources stored in the monitoring object resource database 214 (S1811).

The performance information monitoring unit 215 then judges whether the acquired performance information of the monitoring object resources matches the above policy (S1812). The performance information monitoring unit 215 judges that the preservation period is set longer (S1813) if the performance information matches the policy (S1812: YES) and that the preservation period is set shorter (S1814) if not matching (S1812: NO) and notifies the deletion period setting unit 216 of the result.

The deletion period setting unit 216 obtains the deletion date and time based on the notification from the performance information monitoring unit 215 and the preservation period 223 input from the preservation period setting unit 222 and sets the obtained deletion date and time as the deletion date and time 523 of the invalidated configuration information in the configuration information database 211, and sets the contents of the matched policy as the preservation reason 524 (S1815). The deletion period setting process S1800 is basically executed as above.

Figure 19:
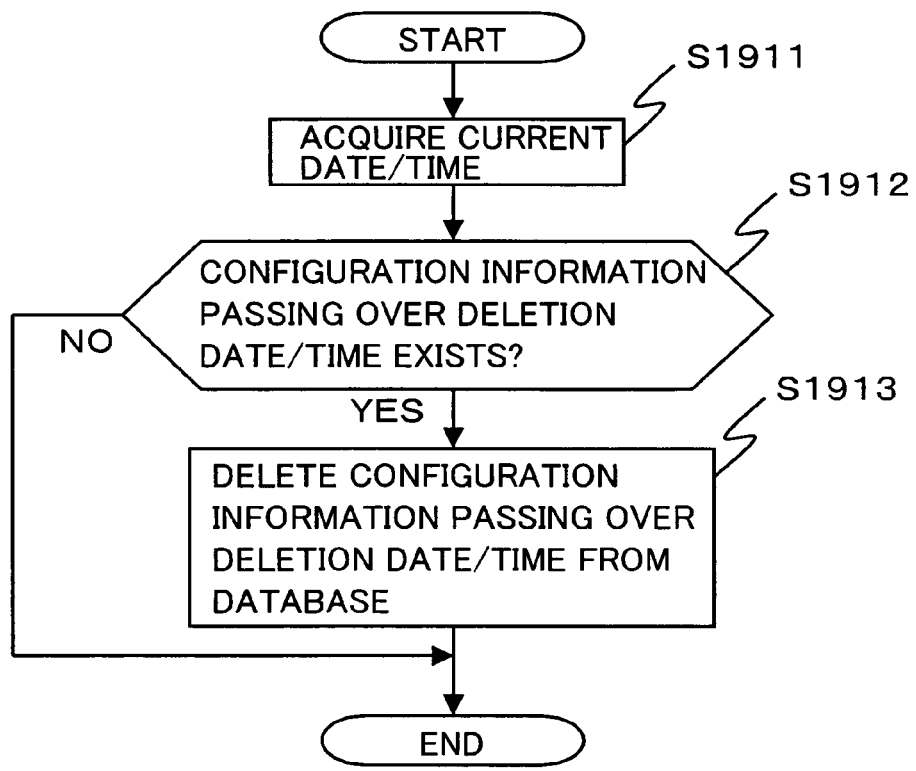
FIG. 19 is an explanatory flowchart of a configuration information deleting process S1900.

FIG. 19 is an explanatory flowchart of a process (hereinafter, a configuration information deleting process S1900) executed by the configuration information deleting unit 217. The configuration information deleting process S1900 will hereinafter be described with reference to FIG. 19. Note that the configuration information deleting process S1900 is activated at a preset timing such as at predetermined time intervals.

The configuration information deleting unit 217 first acquires the current date and time (S1911). The configuration information deleting unit 217 then accesses the configuration information database 211 to judge whether the configuration information passing over the deletion date and time exists (S1912). If the information exists (S1912: YES), the configuration information deleting unit 217 deletes the configuration information passing over the deletion date and time from the configuration information database 211 (S1913). The configuration information deleting process S1900 is basically executed as above.

The above description of the embodiments is for the purpose of facilitating the understanding of the present invention and is not intended to limit the present invention. The present invention may be altered or modified without departing from the spirit thereof and, of course, the present invention encompasses equivalents thereof.

What is claimed is:

1. An information processing apparatus for managing configuration information indicative of a configuration of resources making up a storage system with which I/O paths are set in a storage device, the information processing apparatus comprising:
a monitoring object detecting unit that, upon detecting a change in settings of the I/O paths, extracts resources making up an invalidated I/O path that is invalidated by the change in the settings of the I/O paths as monitoring object resources;
a performance information acquiring unit that acquires performance information indicative of performances of the monitoring object resources from the storage system;
a performance information monitoring unit that performs a judgment of whether the performance information of the monitoring object resources acquired by the performance information acquiring unit matches a preset policy; and
a deletion period setting unit that determines a timing to make configuration information related to the invalidated I/O path deletable from the storage device based on a result of the judgment of whether the performance information of the monitoring object resources matches the preset policy, and manages the determined timing in a manner correlated with the configuration information.

2. The information processing apparatus of claim 1, wherein the monitoring object detecting unit extracts resources making up another I/O path sharing a resource making up the invalidated I/O path as additional monitoring object resources.

3. The information processing apparatus of claim 1, wherein the configuration information related to the invalidated I/O path is at least one of I/O path definition information indicative of a configuration of the invalidated I/O path and resource configuration information that defines relationships among a plurality of the resources making up the invalidated I/O path.

4. The information processing apparatus of claim 1, wherein the storage system includes a storage apparatus, a server apparatus accessing the storage apparatus, and a switch communicatively coupling the storage apparatus and the server apparatus, and wherein an I/O path is set by correlating at least two or more of an application of the server apparatus, a file system of the server apparatus, a volume provided to the file system by the server apparatus, a server port that is a communication port of the server apparatus, a switch port that is a communication port of the switch, a storage port that is a communication port of the storage apparatus, a logical volume provided by the storage apparatus, and a RAID group making up the logical volume.

5. The information processing apparatus of claim 1, wherein the preset policy is at least one of a first policy representative of whether a performance failure is occurring in the monitoring object resources, a second policy representative of whether a possibility of occurrence of a performance failure exists in the monitoring object resources, and a third policy representative of whether the performances of the monitoring object resources are stable.

6. The information processing apparatus of claim 1, further comprising a configuration information deleting unit that deletes the configuration information related to the invalidated I/O path from the storage device when the timing determined by the deletion period setting unit comes.

7. The information processing apparatus of claim 1, further comprising:
a configuration information displaying unit that provides a user interface for displaying the configuration information stored in the storage device; and
a display object setting unit that provides a user interface for setting the configuration information to be displayed by the configuration information displaying unit.

8. The information processing apparatus of claim 7, wherein the display object setting unit provides a first user interface for specifying identifiers of the resources making up the invalidated I/O path and a second user interface for specifying the invalidated I/O path using the resources identified by the identifiers of the resources accepted by the first user interface, and wherein the configuration information displaying unit displays the configuration information of the specified invalidated I/O path.

9. The information processing apparatus of claim 1, further comprising a policy setting unit that provides a user interface for setting the preset policy.

10. A managing method of configuration information executed by an information processing apparatus, the configuration information being indicative of a configuration of resources making up a storage system with which I/O paths are set, the method comprising:
  upon detecting a change in settings of the I/O paths, extracting the resources making up an invalidated I/O path that is invalidated by the change in the settings of the I/O paths as monitoring object resources;
  acquiring performance information indicative of performances of the monitoring object resources from the storage system;
  performing a judgment of whether the performance information of the monitoring object resources acquired by the performance information acquiring unit matches a preset policy; and
  determining a timing to make configuration information related to the invalidated I/O path deletable from the storage device based on a result of the judgment of whether the performance information of the monitoring object resources matches the preset policy, and managing the determined timing in a manner correlated with the configuration information.

11. The managing method of configuration information of claim 10, further comprising extracting resources making up another I/O path sharing a resource making up the invalidated I/O path as additional monitoring object resources, and wherein the extracting step is executed by the information processing apparatus.

12. The managing method of configuration information of claim 10, wherein the configuration information related to the invalidated I/O path is at least one of I/O path definition information indicative of a configuration of the invalidated I/O path and resource configuration information that defines relationships among a plurality of the resources making up the invalidated I/O path.

13. The managing method of configuration information of claim 10, wherein the storage system includes a storage apparatus, a server apparatus accessing the storage apparatus, and a switch communicatively coupling the storage apparatus and the server apparatus, and wherein an I/O path is set by correlating at least two or more of applications of the storage apparatus, a file system of the server apparatus, a volume provided to the file system by the server apparatus, a server port that is a communication port of the server apparatus, a switch port that is a communication port of the switch, a storage port that is a communication port of the storage apparatus, a logical volume provided by the storage apparatus, and a RAID group making up the logical volume.

14. The managing method of configuration information of claim 10, wherein the preset policy is at least one of a first policy representative of whether a performance failure is occurring in the monitoring object resources, a second policy representative of whether a possibility of occurrence of a performance failure exists in the monitoring object resources, and a third policy representative of whether the performances of the monitoring object resources are stable.

* * * * *